US012764611B2

(12) United States Patent
Zhang et al.

(10) Patent No.: US 12,764,611 B2
(45) Date of Patent: Oct. 13, 2026

(54) INTER-UE COORDINATION APPARATUS AND METHOD

(71) Applicant: 1FINITY Inc., Kawasaki (JP)

(72) Inventors: Jian Zhang, Beijing (CN); Pengyu Ji, Beijing (CN); Guorong Li, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 348 days.

(21) Appl. No.: 18/430,162

(22) Filed: Feb. 1, 2024

(65) Prior Publication Data

US 2024/0251302 A1 Jul. 25, 2024

Related U.S. Application Data

(63) Continuation of application No. PCT/CN2021/110813, filed on Aug. 5, 2021.

(51) Int. Cl.
*H04W 28/26* (2009.01)
*H04W 72/25* (2023.01)
(Continued)

(52) U.S. Cl.
CPC .......... *H04W 28/26* (2013.01); *H04W 72/25* (2023.01); *H04W 72/40* (2023.01); *H04W 74/085* (2013.01)

(58) Field of Classification Search
CPC ..... H04W 28/26; H04W 72/25; H04W 72/40; H04W 74/085; H04L 5/0053
(Continued)

(56) References Cited

U.S. PATENT DOCUMENTS

| | | | | |
|---|---|---|---|---|
| 2021/0243749 | A1 | 8/2021 | Hoang et al. | |
| 2024/0015755 | A1* | 1/2024 | Pan | H04W 72/25 |
| 2024/0057121 | A1* | 2/2024 | Ganesan | H04W 72/02 |
| 2024/0237034 | A1* | 7/2024 | Nguyen | H04W 74/0858 |
| 2024/0334454 | A1* | 10/2024 | Luo | H04W 28/26 |

(Continued)

FOREIGN PATENT DOCUMENTS

| | | |
|---|---|---|
| CN | 112703812 A | 4/2021 |
| CN | 113169830 A | 7/2021 |

(Continued)

OTHER PUBLICATIONS

International Search Report and Written Opinion of the International Searching Authority issued by the China National Intellectual Property Administration for corresponding International Patent Application No. PCT/CN2021/110813, mailed on Jan. 10, 2022, with an English translation.

(Continued)

*Primary Examiner* — Obaidul Huq
(74) *Attorney, Agent, or Firm* — Myers Wolin, LLC

(57) ABSTRACT

Embodiments of this disclosure provide an inter-UE coordination apparatus and method, the method including: transmitting sidelink control information and sidelink data information by a terminal equipment, the sidelink control information indicating a reserved resource; performing preemption detection on the reserved resource; and determining whether to receive coordination information used to indicate that a conflict occurs in the reserved resource, and/or determining whether to perform resource reselection based on the received coordination information, according to whether the reserved resource is preempted. Hence, unnecessary resource reselection may be avoided, probabilities of occurrence of conflicts may be reduced, and transmission reliabilities may be improved.

6 Claims, 13 Drawing Sheets

(51) Int. Cl.
*H04W 72/40* (2023.01)
*H04W 74/0833* (2024.01)

(58) Field of Classification Search
USPC ........................................ 370/310, 328, 329
See application file for complete search history.

(56) References Cited

FOREIGN PATENT DOCUMENTS

| | | | |
|---|---|---|---|
| WO | 2020/172576 | A1 | 8/2020 |
| WO | 2020/213986 | A1 | 10/2020 |
| WO | 2021/028387 | A1 | 2/2021 |
| WO | 2021/098858 | A1 | 5/2021 |

OTHER PUBLICATIONS

Notice of Reasons for Refusal issued by the Japan Patent Office for corresponding Japanese Patent Application No. 2024-506563, mailed on Mar. 4, 2025, with an English translation.

CMCC, "Discussion on HARQ feedback for NR V2X", Agenda Item: 7.2.4.5, 3GPP TSG RAN WG1 #98, R1-1908864, Prague, CZ, Aug. 26-30, 2019.

LG Electronics, Discussion on inter-UE coordination for Mode 2 enhancements, Agenda Item: 8.11.1.2, 3GPP TSG RAN WG1 #105-e, R1-2105205, e-Meeting, May 19-27, 2021.

Decision of Refusal and Decision of Dismissal of Amendment issued by the Japan Patent Office for corresponding Japanese Patent Application No. 2024-506563, mailed on Jul. 15, 2025, with an English translation.

LG Electronics, "Discussion on physical layer structure for NR sidelink", Agenda Item: 7.2.4.1, 3GPP TSG RAN WG1 #96bis, R1-1905437, Xi'an, China, Apr. 8-12, 2019.

CATT, "Sidelink physical layer structure in NR V2X", Agenda Item: 7.2.4.1, 3GPP TSG RAN WG1 Meeting #97, R1-1906314, Reno, USA, May 13-17, 2019.

3GPP TS 38.213 V16.6.0, "3rd Generation partnership Project; Technical Specification Group Radio Access Network; NR; Physical layer procedures for control (Release 16)", Jun. 2021.

3GPP TS 38.212 V16.6.0, "3rd Generation Partnership Project; Technical Specification Group Radio Access Network; NR; Multiplexing and channel coding (Release 16)", Jun. 2021.

* cited by examiner

INTER-UE COORDINATION APPARATUS AND METHOD

CROSS-REFERENCE TO RELATED APPLICATION

This application is a continuation of International Application No. PCT/CN2021/110813, filed on Aug. 5, 2021, the entire contents of which are incorporated herein by reference.

TECHNICAL FIELD

This disclosure relates to the field of communication technologies.

BACKGROUND

V2X (Vehicle to Everything) is a vehicle communication technology. Compared with the cellular communication using Uu link, a transmitting device of V2X communicates directly with a receiving device via a sidelink. New Radio (NR) V2X is an important project of 5G Rel-16. Compared with Long Term Evolution (LTE) V2X of Rel-14/Rel-15, NR V2X may support many new scenarios and new services, and may meet higher performance requirements.

Physical channels defined in Rel-16 NR V2X include a physical sidelink control channel (PSCCH), a physical sidelink shared channel (PSSCH), and a physical sidelink feedback channel (PSFCH). The PSCCH carries 1st stage sidelink control information (SCI), the 1st stage SCI being mainly used for reserved resource, and the PSSCH carries 2nd stage SCI and transport blocks (TBs), the 2nd stage SCI being mainly used for TB demodulation.

The PSFCH carries sidelink feedback information (which may be referred to as HARQ-ACK). The PSCCH and PSSCH are usually transmitted at the same slot. A PSCCH/PSSCH is/are associated with one or more PSFCH resources according to established rules. After transmitting a PSCCH/PSSCH, a device may receive acknowledgement (ACK)/nonacknowledgement (NACK) on the associated PSFCH resources. NR V2X supports HARQ-ACK feedback for both unicast and groupcast. Groupcast further includes two HARQ-ACK feedback modes: HARQ option 1 and HARQ option 2.

For groupcast with HARQ option 1, only a receiving device within a certain communication range will feed back HARQ-ACK in a NACK-only mode. More specifically, all receiving devices share the same PSFCH resource, that is, they all feed back on the same PSFCH resource, and only feed back (transmit the PSFCH) when NACK, and do not transmit the PSFCH when ACK, and ACK and NACK are distinguished by presence/absence (or strength) of a PSFCH signal. PSFCHs transmitted by multiple devices will produce equidirectional superposition in the same resource, and the transmitting device determines NACK or ACK according to presence/absence (or strength) of the PSFCH signal, and does not know which receiving device transmits NACK.

For groupcast with HARQ option 2, a PSFCH resource used by each receiving device for feeding back ACK/NACK is independent. The receiving device feeds back ACK in correct reception and feeds back NACK in incorrect reception. ACK and NACK are distinguished by different PSFCH sequences (cyclic shifts), and the transmitting device knows which receiving device transmits ACK/NACK.

A resource (time-frequency resource) used in sidelink transmission is located in a certain resource pool. Two operating modes are defined in NR V2X. For NR V2X mode 1, a resource used by a terminal equipment for V2X communication is scheduled or configured by a network device (base station) via an NR Uu link. And for NR V2X mode 2, the terminal equipment may autonomously select time-frequency resources for V2X communication based on a sensing result.

For the autonomous resource selection (mode 2) of Rel-16 NR V2X, the terminal equipment selects and transmits resources based on a sensing result of itself, which may avoid inter-UE interference or conflict to some extent. However, in some cases, conflicts may still occur in resource transmission. Therefore, as enhancement of autonomous resource selection mode 2, inter-UE coordination also becomes one of the research topics in Rel-17 V2X.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

However, it was found by the inventors that specific modes of inter-UE coordination are issues that need to be studied and resolved. Current inter-UE coordination solutions may result in unnecessary resource reselection and increase probabilities of occurrence of conflicts, thereby resulting degradation performance of packet reception rate (PRR) of the system.

In order to solve at least one of the above problems, embodiments of this disclosure provide an inter-UE coordination apparatus and method.

According to an aspect of the embodiments of this disclosure, there is provided an inter-UE coordination apparatus, including:

- a transmitting unit configured to transmit sidelink control information and sidelink data information, the sidelink control information indicating a reserved resource;
- a preemption detecting unit configured to perform preemption detection on the reserved resource; and
- a processing unit configured to determine whether to receive coordination information used to indicate that a conflict occurs in the reserved resource, and/or determine whether to perform resource reselection based on: the received coordination information, according to whether the reserved resource is preempted.

According to another aspect of the embodiments of this disclosure, there is provided an inter-UE coordination method, including:

- a terminal equipment, transmits sidelink control information and sidelink data information, the sidelink control information indicating a reserved resource; performs preemption detection on the reserved resource; and determines whether to receive coordination information used to indicate that a conflict occurs in the reserved resource, and/or determines whether to perform resource reselection based on the received coordination information, according to whether the reserved resource is preempted.

According to a further aspect of the embodiments of this disclosure, there is provided an inter-UE coordination apparatus, including:

- a receiving unit configured to receive sidelink control information and sidelink data information, the sidelink control information indicating a reserved resource;

a determining unit configured to determine whether the reserved resource is reselected; and a transmitting unit configured to determine whether to transmit coordination information used to indicate that a conflict occurs in the reserved resource according to whether the reserved resource is reselected.

According to still another aspect of the embodiments of this disclosure, there is provided an inter-UE coordination method, including:

a terminal equipment, receives sidelink control information and sidelink data information, the sidelink control information indicating a reserved resource; determines whether the reserved resource is reselected; and determines whether to transmit coordination information used to indicate that a conflict occurs in the reserved resource according to whether the reserved resource is reselected.

According to yet another aspect of the embodiments of this disclosure, there is provided a communication system, including:

a first terminal equipment configured to receive sidelink control information and sidelink data information, the sidelink control information indicating a reserved resource; determine whether the reserved resource is reselected; and determine whether to transmit coordination information used to indicate that a conflict occurs in the reserved resource according to whether the reserved resource is reselected; and a second terminal equipment configured to transmit sidelink control information and sidelink data information, the sidelink control information indicating a reserved resource; perform preemption detection on the reserved resource; and determine whether to receive coordination information used to indicate that a conflict occurs in the reserved resource, and/or determine whether to perform resource reselection based on the received coordination information, according to whether the reserved resource is preempted.

An advantage of the embodiments of this disclosure exists in that the terminal equipment determines whether to receive coordination information used to indicate that a conflict occurs in the reserved resource, and/or determines whether to perform resource reselection based on the received coordination information, according to whether the reserved resource is preempted. Hence, unnecessary resource reselection may be avoided, probabilities of occurrence of conflicts may be reduced, and transmission reliabilities may be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/including/includes" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION OF THE DISCLOSURE

Figure 1:
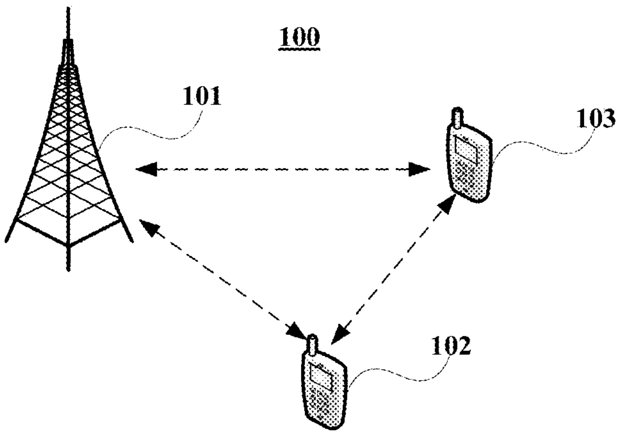
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the terminal equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipment described above. "Device" may refer to a network device, or may refer to a terminal equipment, unless otherwise specified.

Scenarios in the embodiments of this disclosure shall be described below by way of examples; however, this disclosure is not limited thereto.

FIG. 1 is a schematic diagram of a communication system of an embodiment of this disclosure, in which a case where terminal equipment and a network device are taken as examples is schematically shown. As shown in FIG. 1, the communication system 100 may include a network device 101 and terminal equipment 102, 103. For the sake of simplicity, an example having only two terminal equipment and one network device is schematically given in FIG. 1; however, the embodiment of this disclosure is not limited thereto.

In the embodiments of this disclosure, existing services or services that may be implemented in the future may be performed between the network device 101 and the terminal equipment 102, 103. For example, such services may include but not limited to an enhanced mobile broadband (eMBB), massive machine type communication (mMTC), and ultra-reliable and low-latency communication (URLLC), etc.

It should be noted that FIG. 1 shows that two terminal equipment 102, 103 are both within a coverage of the network device 101. However, this disclosure is not limited thereto, and the two terminal equipment 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between the two terminal equipment 102, 103. For example, the two terminal equipment 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

In the embodiments of this disclosure, the terminal equipment(s) 102 and/or 103 may autonomously select sidelink resources (i.e. in mode 2), in which case sidelink transmission may be independent of the network device 101, i.e. the network device 101 is optional. Of course, autonomous selection of sidelink resources (i.e. in mode 2) and allocation of sidelink resources by the network device (i.e. in mode 1) may also be combined in the embodiments of this disclosure, which is not limited in the embodiments of this disclosure.

In LTE V2X and NR V2X, the terminal equipment may obtain sidelink transmission resources in a process of sensing detection plus resource selection, wherein continuous sensing may be performed to obtain occupancy of resources in a resource pool. For example, the terminal equipment may estimate occupancy of resources in a latter period of time (referred to as a selection window) according to occupancy of resources in a former period of time (referred to as a sensing window).

For the autonomous resource selection (mode 2) of Rel-16 NR V2X, the terminal equipment performs resource selection and transmission based on a sensing result of itself, which may avoid inter-UE interference or conflict to some extent. Steps for resource selection may be found in subsection 8.1.4 of TS 38.214 V16.6.0.

Enhancement of autonomous resource selection is introduced into Rel-17 V2X, in which transmission reliability of mode 2 may be improved and transmission latency of mode 2 may be reduced through inter-UE coordination, and the inter-UE coordination has become one of the research topics in Rel-17 V2X. The inter-UE coordination requires inter-UE information exchange, which is referred to as coordination information. The coordination information may be used to enhance resource selection in mode 2. And the coordination information may indicate whether there is a conflict, which may include a resource conflict problem, and a half duplex problem, etc.

Figure 2:
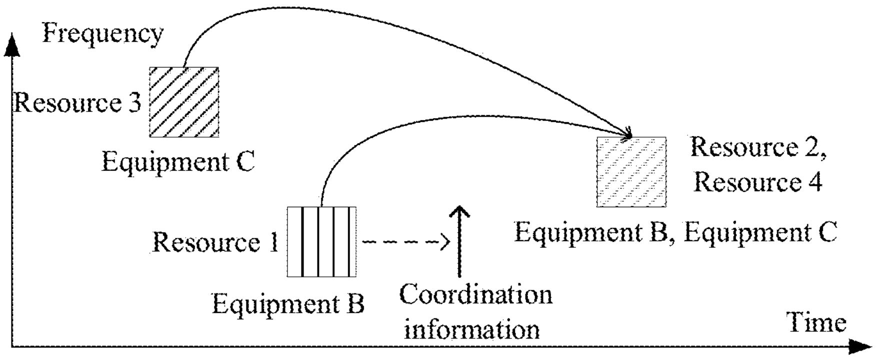
FIG. 2 is an explanatory diagram of inter-UE coordination of an embodiment of this disclosure.

FIG. 2 is an explanatory diagram of inter-UE coordination of an embodiment of this disclosure. As shown in FIG. 2, a resource (resource 1) of a second terminal equipment (equipment B) for sidelink transmission reserves a next resource (resource 2) via SCI, a resource (resource 3) of a third terminal equipment (equipment C) for sidelink transmission reserves a next resource (resource 4) via SCI, and a conflict occurs between resource 2 and resource 4. Here, the conflict includes a collision problem (resources are overlapped partially or completely), or a half duplex problem (resources are not overlapped but are transmitted simultaneously). Here, the SCI refers to 1st stage SCI carried by a PSCCH.

The first terminal equipment (equipment A) may receive SCI transmitted by equipment B at resource 1, and may also receive SCI transmitted by equipment C at resource 3. Based on the SCI, equipment A may learn that resource 2 and resource 4 of equipment B and equipment C will conflict in the future, that is, a collision problem or a half duplex problem will occur.

For example, the collision problem may cause equipment A to be unable to correctly receive information transmitted by equipment B at resource 2 (or information transmitted by equipment C at resource 4), and the half duplex problem may cause equipment B to be unable to receive, at a slot where resource 2 is located, information transmitted by equipment C at resource 4, or, may cause equipment C to be unable to receive, at a slot where resource 4 is located, information transmitted by equipment B at resource 2.

Therefore, equipment A transmits coordination information to equipment B before the conflict occurs, notifying equipment B that a conflict will occur in its reserved resource 2. After receiving the coordination information, equipment B performs resource reselection on resource 2, that is, it may select a resource not conflicting with resource 4 for transmission, thereby avoiding conflicts.

However, it was found by the inventors that for sidelink inter-UE coordination, resource reselection performed based on coordination information may be unnecessary and increase probabilities of occurrence of conflicts.

Figure 3:
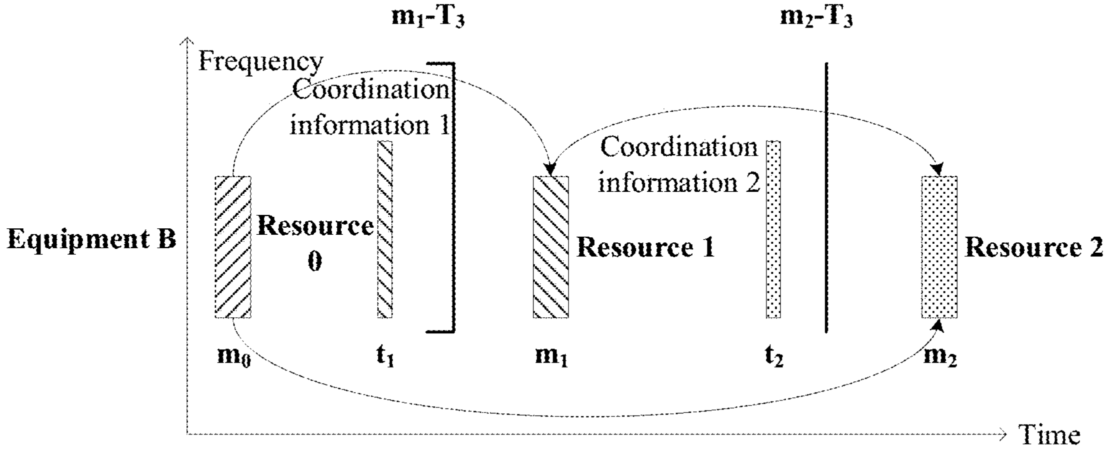
FIG. 3 is an explanatory diagram of a reserved resource of an embodiment of this disclosure.

FIG. 3 is an explanatory diagram of a reserved resource of the embodiment of this disclosure. As shown in FIG. 3, equipment B performs resource selection and determines to transmit initial transmission, first retransmission and second retransmission at resource 0, resource 1 and resource 2, respectively. SCI on resource 0 reserves resource 1 and resource 2, while SCI on resource 1 reserves resource 2; and "coordination information" denotes an opportunity of equipment A for transmitting the coordination information.

Figure 4:
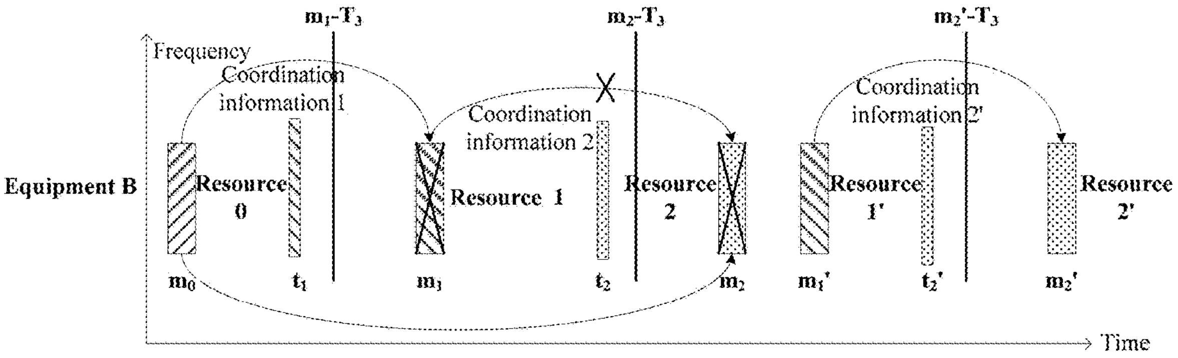
FIG. 4 is an explanatory diagram of inter-UE coordination and resource reselection of an embodiment of this disclosure.

FIG. 4 is an explanatory diagram of inter-UE coordination and resource reselection of the embodiment of this disclosure. Equipment B may perform resource reselection based on reevaluation and preemption. As shown in FIG. 4, assuming that equipment B finds that resource 1 and resource 2 are preempted at a slot $m_1-T_3$, it needs to complete resource reselection for resource 1 and resource 2 before a slot $m_1$. Assuming that resources after the reselection are resource 1' and resource 2', equipment B actually only transmits at resource 0, resource 1' and resource 2'; where, $T_3$ denotes a processing time, and its specific definition may be found in subsection 8.1.4 of TS 38.214 V16.6.0 and subsection 5.22.1.2a of TS 38.321 V16.5.0.

According to existing techniques, equipment A is unable to learn that equipment B has performed reselection on resource 1 and resource 2. Equipment A receives SCI at slot $m_0$, and learns that equipment B has reserved resource 1 and resource 2. Equipment A is only able to transmit coordination information for the reserved resources. It is assumed that equipment A finds before slot $t_2$ that resource 2 will conflict with the resources reserved by equipment C, and equipment A transmits coordination information 2 to equipment B at slot $t_2$ to indicate this conflict. Equipment B has actually completed resource reselection of resource 2 before receiving the coordination information 2.

As equipment B does not transmit on resource 2, the conflict observed by equipment A will not actually occur, and there is no need for equipment B to perform reselection on resource 2 based on coordination information 2. If equipment B still performs resource reselection on resource 2 based on coordination information 2, equipment B actually performs resource reselection and retransmission for a further time, and the reselected resource may conflict with transmission resources of other equipment, thereby leading to data transmission failures of the other equipment.

Addressed to at least one of the above problems, the embodiment of this disclosure provides a solution to avoid unnecessary resource reselection.

In the embodiments of this disclosure, a sidelink shall be described by taking V2X as an example; however, this disclosure is not limited thereto, and it may also be applicable to other scenarios of sidelink transmission than V2X. In the following explanation, without causing confusion, the terms "sidelink" and "V2X" are interchangeable, the terms "PSFCH" and "sidelink feedback channel" are interchangeable, the terms "PSCCH" and "sidelink control channel" or "sidelink control information" are interchangeable, and the terms "PSSCH" and "sidelink data channel" or "sidelink data" are interchangeable.

In addition, transmitting or receiving a PSCCH may be understood as transmitting or receiving sidelink control information carried by the PSCCH, transmitting or receiving a PSSCH may be understood as transmitting or receiving sidelink data carried by the PSSCH, transmitting or receiving a PSFCH may be understood as transmitting or receiving sidelink feedback information carried by the PSFCH, and sidelink transmission (also referred to as sidelink transmitting) may be understood as PSCCH/PSSCH transmission or sidelink data/information transmission.

Embodiments of a First Aspect

The embodiment of this disclosure provides an inter-UE coordination method, which shall be described by taking a second terminal equipment (equipment B) as an example.

Figure 5:
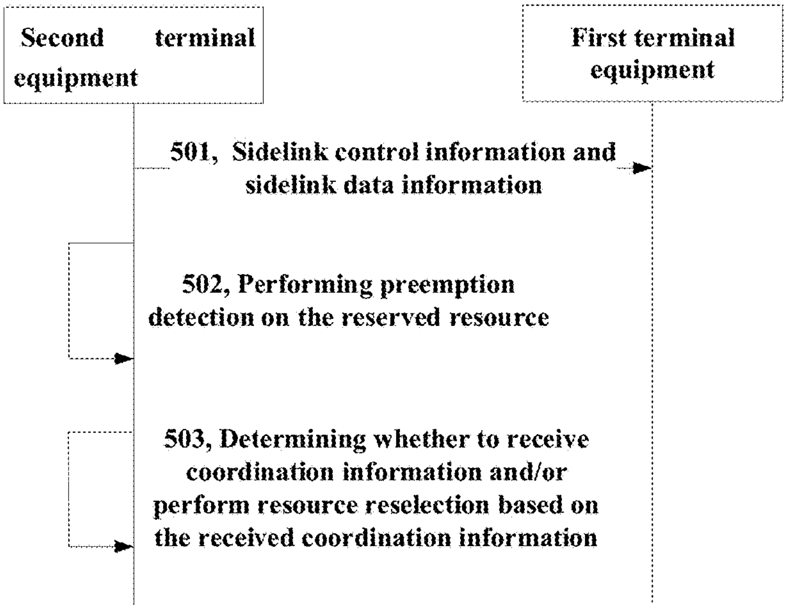
FIG. 5 is a schematic diagram of the inter-UE coordination method of an embodiment of this disclosure.

FIG. 5 is a schematic diagram of the inter-UE coordination method of the embodiment of this disclosure. As shown in FIG. 5, the method includes:

501: the second terminal equipment transmits sidelink control information and sidelink data information, the sidelink control information indicating a reserved resource;

502: the second terminal equipment performs preemption detection on the reserved resource; and

503: the second terminal equipment determines whether to receive coordination information used to indicate that a conflict occurs in the reserved resource, and/or the second terminal equipment determines whether to perform resource reselection based on the received coordination information, according to whether the reserved resource is preempted.

It should be noted that FIG. 5 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 5.

In some embodiments, the second terminal equipment may transmit sidelink control information and sidelink data information to the first terminal equipment, and may also transmit sidelink control information and sidelink data information to other terminal equipment. Description shall be given in FIG. 5 by taking that a receiver is the first terminal equipment as an example; however, this disclosure is not limited thereto.

The sidelink data information is carried by a physical sidelink shared channel (PSSCH). The sidelink control information (SCI) indicates a reserved resource, which may be reserved by "Frequency resource assignment" and "Time resource assignment" fields (referred to as time-frequency resource fields) of the SCI, or may also be reserved by a "Resource reservation period" field (referred to as a period field) of the SCI.

For example, as shown in FIG. 3, the SCI transmitted on an initial transmission resource 0 reserves retransmission resource 1 and retransmission resource 2 via the "Frequency resource assignment" and "Time resource assignment" fields, and the SCI transmitted on resource 1 reserves resource 2 via the "Frequency resource assignment" and "Time resource assignment" fields.

Figure 6:
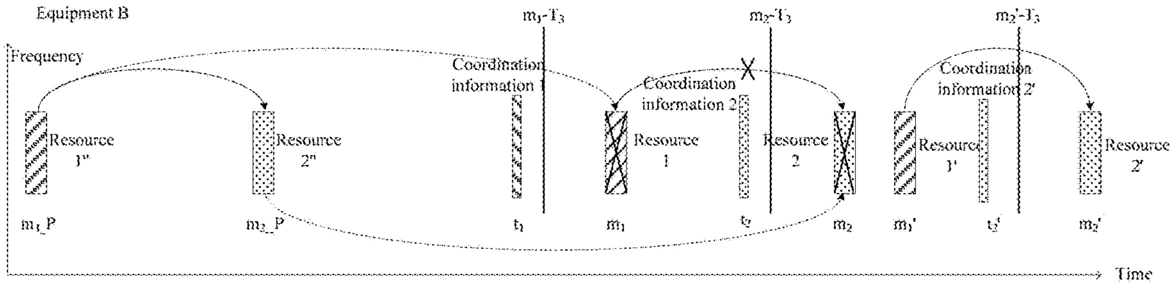
FIG. 6 is another explanatory diagram of the inter-UE coordination and resource reselection of the embodiment of this disclosure.

FIG. 6 is another explanatory diagram of the inter-UE coordination and resource reselection of the embodiment of this disclosure. For another example, as shown in FIG. 6, SCI transmitted at an initial transmission resource 1" in a previous period (slot $m_1$_P; where, P is the period) reserves an initial transmission resource 1 of a next period (slot $m_1$) via a period field, and reserves an retransmission resource 2" of the previous period via a time-frequency resource fields, and SCI transmitted at an retransmission resource 2" in the previous period reserves an retransmission resource 2 of the next period via a period field. Assuming that equipment B finds that resource 1 and resource 2 are preempted at slot $m_1$-$T_3$, resource reselection needs to be performed on resource 1 and resource 2 before slot $m_1$.

The case where the SCI indicates the reserved resources are described above, and the terminal equipment may perform preemption detection on the reserved resources. Reference may be made to relevant techniques for contents of the preemption detection. The coordination information shall be described below.

In some embodiments, the first terminal equipment (equipment A) may transmit coordination information to the second terminal equipment (equipment B) and/or other terminal equipment (equipment C). The coordination information may indicate whether there exists a conflict or expected conflict, and it may equivalently say that the coordination information may indicate whether equipment B and/or equipment C performs resource reselection.

In the embodiments of this disclosure, according to whether the reserved resources are preempted, the terminal equipment may determine whether to receive the coordination information indicating the reserved resources where conflicts occur, and/or determine whether to perform resource reselection based on the received coordination information.

In some embodiments, when the reserved resources are not preempted, the second terminal equipment (equipment B) determines to receive the coordination information, and when the reserved resources are preempted, it determines to skip receiving the coordination information.

In some embodiments, when the reserved resources are not preempted, the second terminal equipment (equipment B) determines to perform resource reselection based on the received coordination information, and when the reserved resources are preempted, the second terminal equipment (equipment B) determines to skip performing resource reselection based on the received coordination information.

The term "preemption" in the embodiments of this disclosure may be replaced with "reselection". "Preemption" refers to finding that a resource has been preempted but resource reselection of the preempted resource is not necessarily completed. "Reselection" indicates that resource reselection of a preempted resource has been completed. Equipment B may determine whether to receive the coordination information, and/or whether to perform resource reselection based on received coordination information, according to whether the reserved resources are preempted, or whether the reserved resources are reselected.

In other words, if equipment B has already determined to perform resource reselection on the reserved resources related to the coordination information before receiving the coordination information, equipment B may skip receiving the coordination information, that is, it does not receive the coordination information; or, equipment B may drop the received coordination information. In other words, equipment B receives the coordination information but deems that the coordination information is invalid. Hence, equipment B does not perform resource reselection on the reserved resources related to it based on the coordination information, that is, equipment B skips performing resource reselection based on the received coordination information.

Table 1 schematically illustrates another expression of the above content; however, this disclosure is not limited thereto.

TABLE 1

| |
|---|
| For a resource reserved by UE B, UE-B receives the coordination information which is associated with the reserved resource except when UE-B has determined to perform resource reselection for the reserved resource before receiving the coordination information. |
| For a resource reserved by UE B, if receiving the coordination information which is associated with the reserved resource, UE-B performs resource reselection for the reserved resource except when UE-B has determined to perform resource reselection for the reserved resource before receiving the coordination information. |

Here, "the reserved resources related to the coordination information" indicates that the coordination information may indicate whether conflicts occur in the reserved resources. Likewise, "the coordination information related to the reserved resources" also indicates that the coordination information may indicate whether conflicts occur in the reserved resources.

For example, as shown in FIG. 4, the reserved resource related to coordination information 2 refers to resource 2. Before receiving coordination information 2, equipment B has already determined to perform resource reselection on resource 2. Therefore, equipment B may skip receiving coordination information 2, or equipment B receives coordination information 2 but does not use coordination information 2, and coordination information 2 will not trigger equipment B to perform resource reselection on resource 2 again.

For another example, as shown in FIG. 6, equipment B has already determined to perform resource reselection on resource 2 before receiving coordination information 2. Therefore, equipment B may skip receiving coordination information 2, or equipment B may receive coordination information 2 but does not perform resource reselection on resource 2 based on coordination information 2.

Therefore, the terminal equipment identifies unnecessary resource reselection based on the preemption detection and skips receiving relevant coordination information or skips performing resource reselection based on the received coordination information, thereby avoiding unnecessary resource reselection, reducing a probabilities of occurrence of conflicts, and improving transmission reliabilities.

How to transmit the coordination information to indicate expected conflicts is not limited in the embodiments of this disclosure. Transmission of the coordination information and occasions of the preemption detection shall be further described below.

In some embodiments, explanation of "before equipment B receives the coordination information" is as follows. Assuming that slot t is a slot at which equipment B receives the coordination information, slot. t-d is deemed as before equipment B receives the coordination information, where, d>0. Optionally, d may be equal to 0. In other words, if equipment B determines to perform resource reselection on the reserved resources related to the coordination information at the slot at which it receives the coordination information, equipment B may skip receiving the coordination information, or equipment B may drop the received coordination information.

Figure 7:
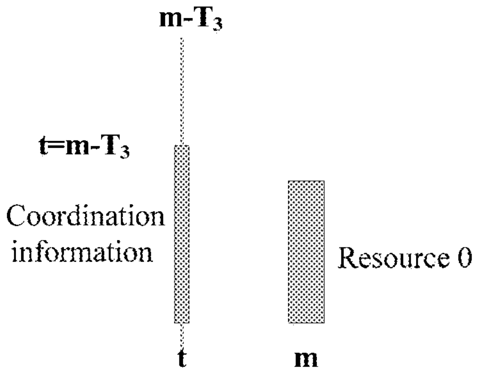
FIG. 7 is an explanatory diagram of preemption detection and coordination information of an embodiment of this disclosure.

FIG. 7 is an explanatory diagram of the preemption detection and coordination information of the embodiment of this disclosure. As shown in FIG. 7, for example, equipment B performs preemption detection at slot $m-T_3$ and determines to perform resource reselection on reserved resource 0, and receives coordination information related to resource 0 at slot t, where, $t=m-T_3$. This is equivalent to that equipment B determines to perform resource reselection on reserved resource 0 at slot t−d and receives the coordination information at slot t, where, d=0.

In this case, equipment B may skip receiving the coordination information at slot t or drop the coordination information received at slot t. Optionally, equipment B may also perform resource reselection solely based on the coordination information, rather than based on preemption. In general, if equipment B determines to perform resource reselection on resource 0 at slot t based on preemption, and also determines to perform resource reselection on resource 0 based on the coordination information at the same slot t, equipment B will not be triggered to perform resource reselection twice, but perform resource reselection once only.

Figure 8:
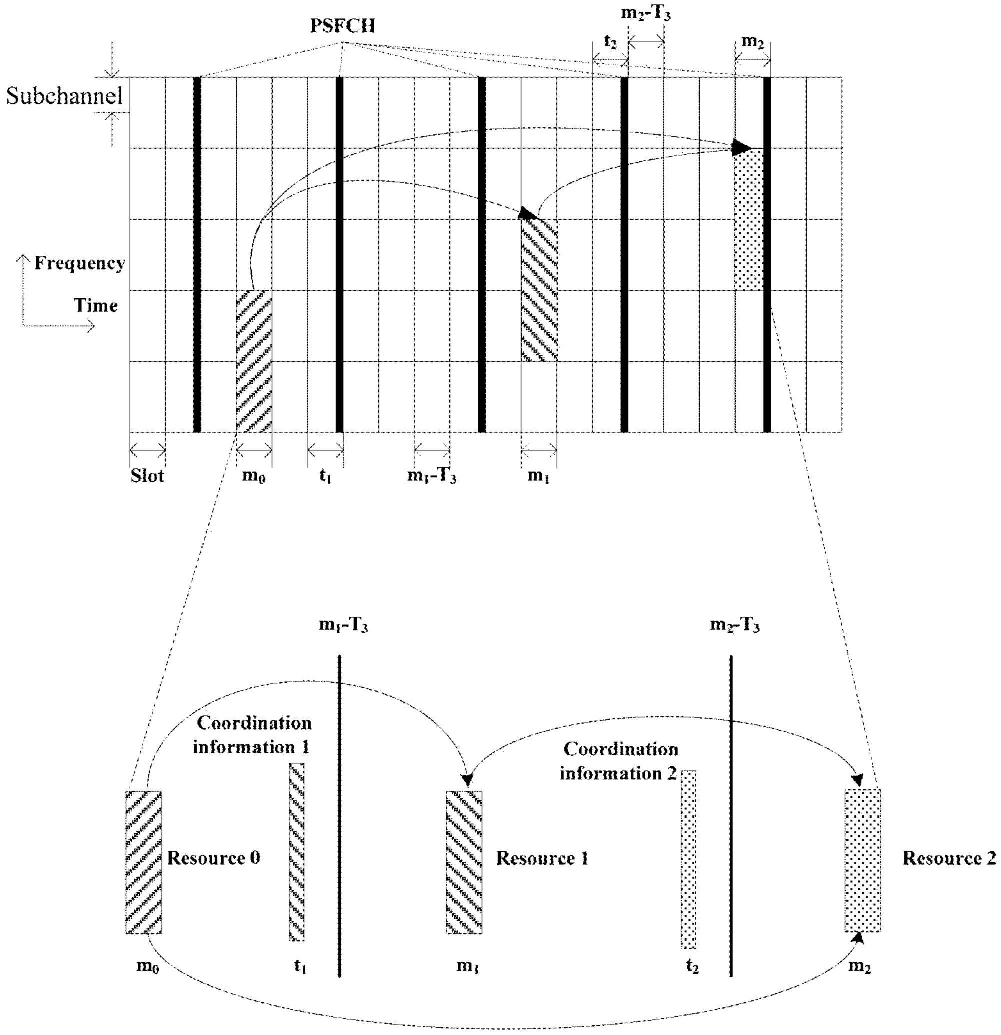
FIG. 8 is an explanatory diagram of transmitting coordination information via a PSFCH of an embodiment of this disclosure.

FIG. 8 is an explanatory diagram of transmitting the coordination information via a PSFCH of the embodiment of this disclosure. The PSFCH is used to transmit the coordination information. A PSFCH resource may be configured in a method in existing standards, and reference may be made to relevant techniques for specific contents thereof.

As shown in FIG. 8, for example, the PSFCH appears in a periodic form in the time domain, and is a set of physical resource blocks (PRBs) in the frequency domain. From the perspective of equipment B, the SCI transmitted at initial transmission resource 0 reserves retransmission resource 1 and retransmission resource 2, and retransmission resource 1 reserves retransmission resource 2. Indications of the SCI for the reserved resources follow existing standards, which are not limited in this disclosure. For a reserved resource, it is possible to determine coordination information resource associated with it.

Taking resource 1 at slot $m_1$ as an example, taking reserving sufficient processing time for equipment B into account, the coordination information should not be later than slot $m_1$-$T_3$. The processing time may be ensured in the following method, and it may be ensured that the number of PSSCH slots associated with the same PSFCH slot does not exceed the PSFCH period. Assuming that slot $m_1$−K is a slot temporally earlier than slot $m_1$ by $\overline{K}$ logical slots, where, $\overline{K}$ is equal to $T_3$, and the slot where the coordination information is located is a PSFCH slot that is not temporally later than slot $m_1$−K and closest to slot $m_1$−K. Hence, it may ensure that the slot where the coordination information is located is not later than slot $m_1$−$T_3$.

It should be noted that K here is in units of slots and determined by $\overline{K}$ in units of logical slots, and denotes the number of slots to which $\overline{K}$ logical slots correspond. K denotes a time interval, K≥K. A specific value of $\overline{K}$ is dependent on a subcarrier spacing, for example, as shown in Table 2, $\overline{K}$ is equal to $T_3$ logical slots. Slot $m_1$−K denotes a slot temporally earlier than slot $m_1$ by $\overline{K}$ logical slots. In other words, a time interval between slot $m_1$−K and slot $m_1$ is $\overline{K}$ logical slots.

TABLE 2

| Subcarrier spacing | $\overline{K}$ |
|---|---|
| 15 KHz | 3 |
| 30 KHz | 5 |
| 60 KHz | 9 |
| 120 KHz | 17 |

Therefore, the slot where coordination information 1 is located is $t_1$=$m_1$−a; wherein, a is a smallest integer greater than or equal to K, and slot $t_1$ is a slot containing the PSFCH. According to the above method, it may be determined that coordination information 1 associated with resource 1 is located in slot $t_1$ in FIG. 8; wherein, $t_1$ is a PSFCH slot that is not temporally later than slot $m_1$−K and closest to slot $m_1$−K. Likewise, it may be determined that coordination information 2 related to resource 2 is located at slot $t_2$. For the sake of simplicity, it is assumed in the embodiments of this disclosure that all the slots in the figure are logical slots in a resource pool, thus, $m_1$−K=$m_1$−$T_3$. The slot where the coordination information is located is determined above, and furthermore, the PSFCH resource used by the coordination information may be determined.

Figure 9:
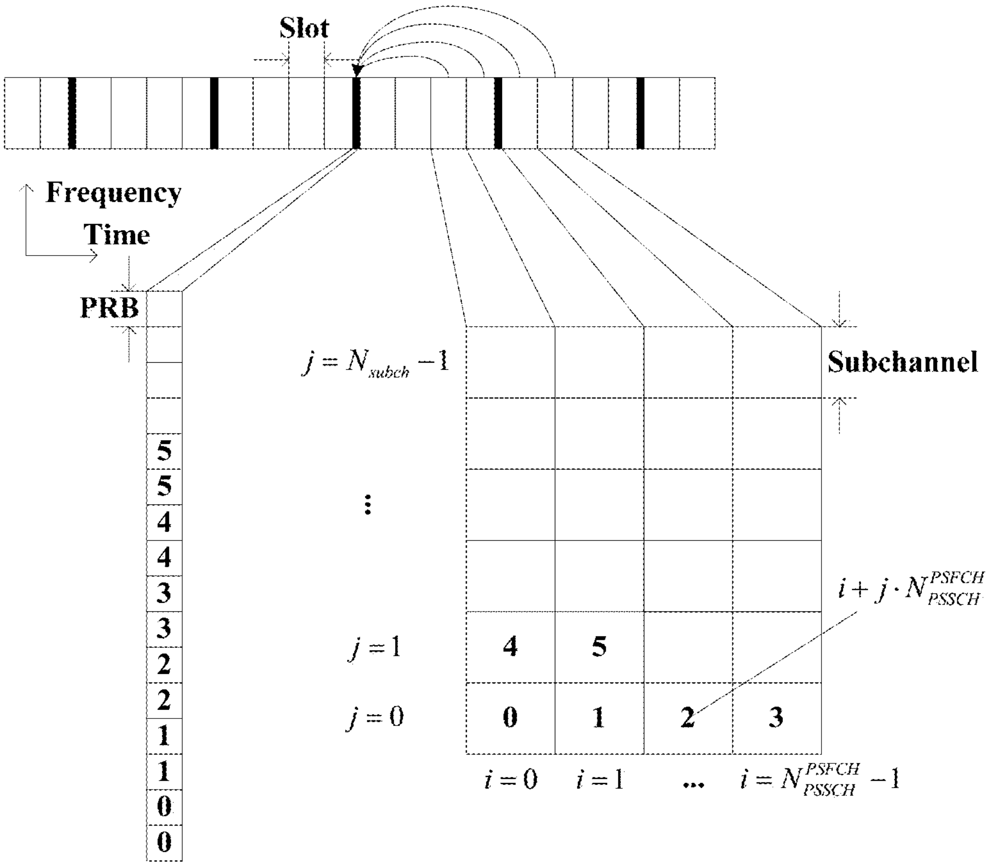
FIG. 9 is an explanatory diagram of determining a PSFCH resource of an embodiment of this disclosure.

FIG. 9 is an explanatory diagram of determining the PSFCH resource of the embodiment of this disclosure. Assuming that a PSSCH transmitted at a reserved resource includes $$N_{subch}^{PSSCH}$$

subchannels, and a PSFCH period thereof is $$N_{PSSCH}^{PSFCH}$$

slots, wherein the number of PRBs allocated for the PSFCH in each slot is $$M_{PRB,set}^{PSFCH},$$

and the resource pool includes $N_{subch}$ subchannels. According to the above method for determining the PSFCH slot where the coordination information is located, at most $$N_{PSSCH}^{PSFCH}$$

PSSCH slots (where reserved resources may possibly be present) will be associated with the same PSFCH slot.

In other words, $$M_{PRB,set}^{PSFCH}$$

PRBs within a PSFCH slot are associated with $$N_{subch} \cdot N_{PSSCH}^{PSFCH}$$

subchannels within $$N_{PSSCH}^{PSFCH}$$

slots. As shown in FIG. 9, for a subchannel j (wherein $$0 \le i \le N_{PSSCH}^{PSFCH} - 1, \text{ and } 0 \le j \le N_{subch} - 1)$$

within slot i, $$M_{subch,slot}^{PSFCH} = M_{PRB,set}^{PSFCH} / \left(N_{subch} \cdot N_{PSSCH}^{PSFCH}\right)$$

More specifically, $$M_{subch,slot}^{PSFCH}$$

PRBs with indices from $$\left(i + j \cdot N_{PSSCH}^{PSFCH}\right) \cdot M_{subch,slot}^{PSFCH}$$

to $$\left(i + 1 + j \cdot N_{PSSCH}^{PSFCH}\right) \cdot M_{subch,slot}^{PSFCH} - 1$$

For a reserved resource PSSCH, $$N_{type}^{PSFCH} \cdot M_{subch,slot}^{PSFCH}$$

PRBs associated with the PSSCH may be determined according to its starting subchannel; wherein, $$N_{type}^{PSFCH} = 1;$$

or, $$N_{type}^{PSFCH} \cdot M_{subch,slot}^{PSFCH}$$

PRBs associated with the PSSCH may be determined according to all subchannels included in the PSSCH; wherein, $$N_{type}^{PSFCH} = N_{subch}^{PSFCH}.$$

Furthermore, each PRB may contain $$N_{CS}^{PSFCH}$$

cyclic shift pairs.

As a PSFCH resource is determined by a PRB and a cyclic shift pair, the number of PSFCH resources with which a PSSCH is associated is $$R_{PRB,CS}^{PSFCH} = N_{type}^{PSFCH} \cdot M_{subch,slot}^{PSFCH} \cdot N_{CS}^{PSFCH}.$$

For a reserved resource PSSCH, a PSFCH resource with an index of $$(P_{ID}) \bmod R_{PRB,CS}^{PSFCH}$$

is used to carry the coordination information; wherein, $P_{ID}$ is a 8-bit physical layer source ID contained in the SCI reserving the resource.

How to indicate an expected conflict is not limited in the embodiments of this disclosure. For example, when there exists an expected conflict, equipment A transmits the PSFCH (coordination information), and when there exists no expected conflict, equipment A does not transmit PSFCH (coordination information). For another example, when there exists an expected conflict, equipment A transmits a PSFCH (coordination information) with a cyclic shift of C0, and when there exists no expected conflict, equipment A transmits a PSFCH (coordination information) with a cyclic shift of C1.

In some embodiments, at a second slot prior to a first time interval of a first slot receiving the coordination information, detecting whether the reserved resource is preempted, wherein the first time interval is greater than or equal to 0.

Figure 10A:
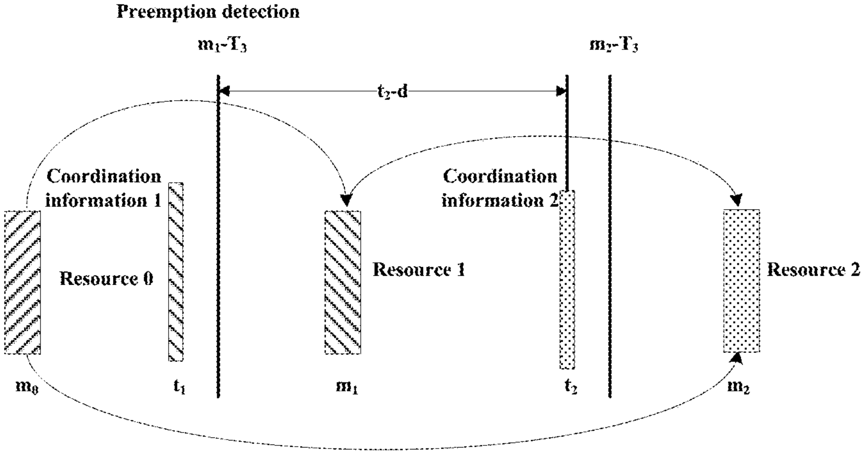
FIG. 10A is a schematic diagram of a time interval of an embodiment of this disclosure.

FIG. 10A is a schematic diagram of the time interval of the embodiment of this disclosure. For example, as shown in FIG. 10A, slot $t_2$ is a slot when equipment B receives coordination information 2 associated with reserved resource 2, slot $m_1-T_3$ is a slot detecting whether reserved resource 1 and reserved resource 2 are preempted, and slot $m_1-T_3=t_2-d$ is deemed as "the second slot prior to the first time interval of the first slot receiving the coordination information", wherein the first time interval (d) is greater than 0.

Figure 10B:
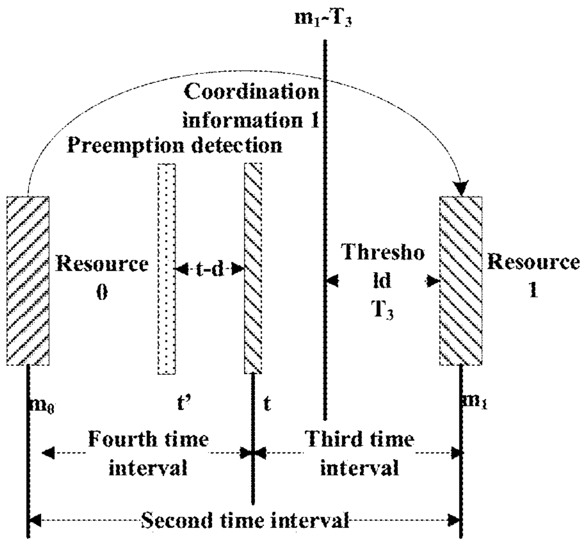
FIG. 10B is another schematic diagram of the time interval of the embodiment of this disclosure.

FIG. 10B is another schematic diagram of the time interval of the embodiment of this disclosure. For example, as shown in FIG. 10B, it is assumed that slot t is a slot when equipment B receives the coordination information associated with the reserved resource, slot t' is the slot detecting whether the reserved resource is preempted, and slot t-d is deemed as "the second slot prior to the first time interval of the first slot receiving the coordination information", wherein the first time interval (d) is greater than 0, and optionally, the first time interval (d) may be equal to 0.

In some embodiments, there exists a second time interval between the reserved resource and at least one piece of sidelink control information indicating the reserved resource, such as an interval between slot $m_0$ where the sidelink control information indicating reserved resource 1 is located and slot $m_1$ where reserved resource 1 is located shown in FIG. 10B; and there exists a receiving slot of the coordination information within the second time interval, such as slot t where coordination information 1 is located shown in FIG. 10B.

In some embodiments, the second time interval includes a third time interval and a fourth time interval.

The third time interval is a time interval between the reserved resource and a receiving slot of the corresponding coordination information, such as an interval between slot $m_1$ where reserved resource 1 is located and slot t where coordination information 1 is located, as shown in FIG. 10B. And the fourth time interval is an interval between the receiving slot of the coordination information and the sidelink control information indicating the reserved resource, such as an interval between slot t where coordination information 1 is located and slot $m_0$ where the sidelink control information indicating reserved resource 1 is located, as shown in FIG. 10B.

The third time interval is greater than or equal to a threshold in units of logical slots, for example, the threshold is $\overline{K}$ shown in FIG. 10B and Table 2; as described above, $\overline{K}$ logical slots are temporally equal to K slots, and it is assumed in FIG. 10B that $K=\overline{K}$ and $\overline{K}=T_3$; on the premise of satisfying the third time interval, the receiving slot of the coordination information to which the reserved resource corresponds is a slot where a physical sidelink feedback channel is located most close to a slot where the reserved resource is located, and as shown in FIG. 8, the PSFCH at slot $t_1$ is a receiving slot of coordination information 1 corresponding to reserved resource $m_1$ on the premise of satisfying the third time interval.

In some embodiments, the fourth time interval is determined based on a UE capability or UE implementation.

Taking limitation of processing time into account, transmitting or receiving the coordination information after slot $m_1-T_3$ is meaningless, as equipment B has no time to perform resource reselection according to the coordination information. Assuming that resource 0 at slot $m_0$ reserves resource 1 at slot $m_1$, if the coordination information is to be used, a time interval between resource 0 and resource 1 should be at least greater than one threshold; otherwise, the coordination information is unable to be used to perform resource reselection on resource 1.

Figure 11:
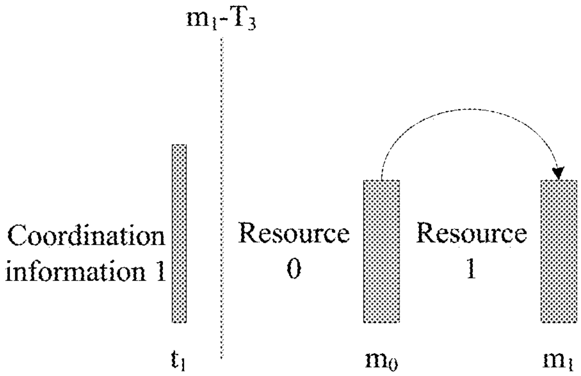
FIG. 11 is another explanatory diagram of the preemption detection and coordination information of an embodiment of this disclosure.

FIG. 11 is another explanatory diagram of the preemption detection and coordination information of the embodiment of this disclosure. As shown in FIG. 11, the time interval between resource 0 and resource 1 is too small, causing the slot where the coordination information is located to be even located before resource 0. As equipment A learns only at time $m_0$ that resource 1 is reserved, it has no time to transmit the coordination information for resource 1, making it impossible for equipment B to perform resource reselection on resource 1 based on the coordination information.

In some embodiments, in order to utilize inter-UE coordination, equipment B may ensure one minimum time interval (the second time interval) between the reserved resource and at least one piece of SCI reserving the resource during resource selection, wherein the minimum time interval satisfies a requirement of the coordination information for processing time.

Figure 12:
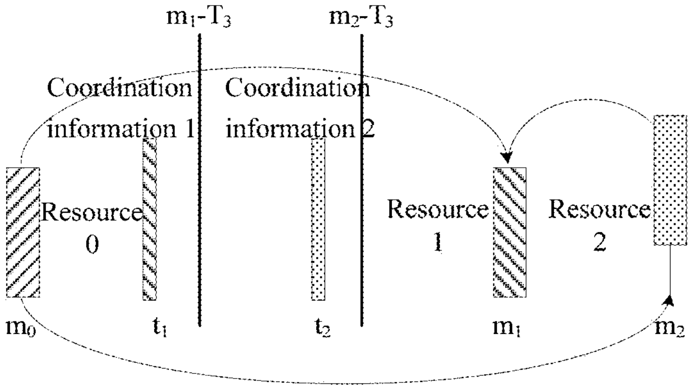
FIG. 12 is an explanatory diagram of a coordination information opportunity of an embodiment of this disclosure.

FIG. 12 is an explanatory diagram of a coordination information opportunity of the embodiment of this disclosure. As shown in FIG. 12, there exists a coordination information opportunity (coordination information 1) between reserved resource 1 and the SCI reserving the resource (i.e. resource 0), and there exists a coordination information opportunity (coordination information 2) between reserved resource 2 and resource 0, hence, reselection may be performed on both resource 1 and resource 2 by using the coordination information. Although there exists no coordination information opportunity between resource 1 and resource 2, use of the coordination information is not affected, as long as one piece of SCI reserving resource 1 (resource 2) satisfies the above conditions, and the SCI satisfying the conditions in FIG. 12 is located at resource 0.

More specifically, the minimum time interval consists of two parts, one part is a time interval (the third time interval) between the reserved resource and the coordination information associated therewith, which may be determined in the method for determining a PSFCH as described above, and the other part is a time interval (fourth time interval) between the SCI reserving the resource and the coordination information, which may be determined based on the UE capability or UE implementation.

The coordination information and preemption detection are schematically described above, and whether to receive the coordination information shall be further described below.

Figure 13:
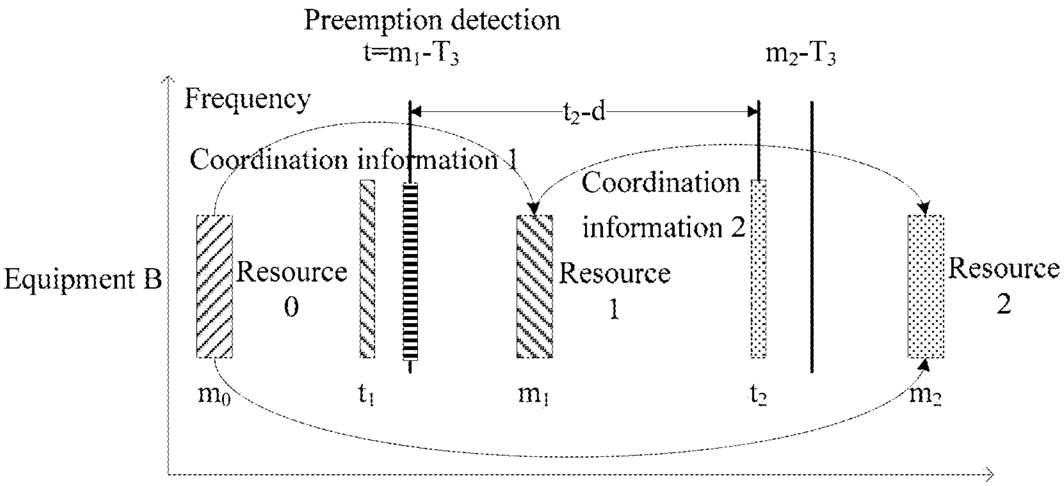
FIG. 13 is an explanatory diagram of whether to receive coordination information of an embodiment of this disclosure.

FIG. 13 is an explanatory diagram of whether to receive the coordination information of the embodiment of this disclosure. For example, FIG. 13 shows a case where the first time interval (d) is greater than 0, wherein equipment B performs preemption detection on resource 1 and resource 2 at slot $t=m_1-T_3=t_2-d$, and coordination information 2 at slot $t_2$ indicates that a conflict occurs in reserved resource 2.

Equipment B transmits the SCI at slot $m_0$ of resource 0, the SCI reserving resource 1 and resource 2. Assuming that equipment B does not receive the coordination information at slot $t_1$, equipment B performs preemption detection on reserved resource 1 and reserved resource 2 at slot t. When it detects that reserved resource 2 is not preempted, it determines to receive coordination information 2, and performs resource reselection based on received coordination information 2. When equipment B detects that reserved resource 2 is preempted, it may determine that a conflict occurs in reserved resource 2, and then decide to perform reselection on reserved resource 2. For example, the resource reselection is performed based on a resource reselection method in existing standards, and receiving coordination information 2 is skipped.

As shown in FIG. 13, when the first time interval (d) is greater than 0, equipment B transmits SCI at slot $m_0$ of resource 0, the SCI reserving resource 1 and resource 2. Assuming that equipment B does not receive coordination information at slot $t_1$, equipment B performs preemption detection on reserved resource 1 and reserved resource 2 at slot t, determines to receive coordination information 2 when it detects that reserved resource 2 is not preempted, and performs resource reselection based on received coordination information 2; when equipment B detects that reserved resource 2 is preempted, it may determine that a conflict occurs in reserved resource 2, and then decide to perform reselection on the reserved resource. For example, the resource reselection is performed based on a resource reselection method in existing standards, and coordination information 2 is received but skipping performing resource selection based on the received coordination information 2 (receiving coordination information 2 but dropping contents indicated by received coordination information 2).

In some embodiments, a meaning of receiving the coordination information but skipping performing resource reselection based on the received coordination information is dropping the received coordination information. For example, equipment B receives the coordination information but deems that the coordination information is invalid, hence, it does not perform resource reselection on the reserved resource related thereto based on the coordination information.

Figure 14:
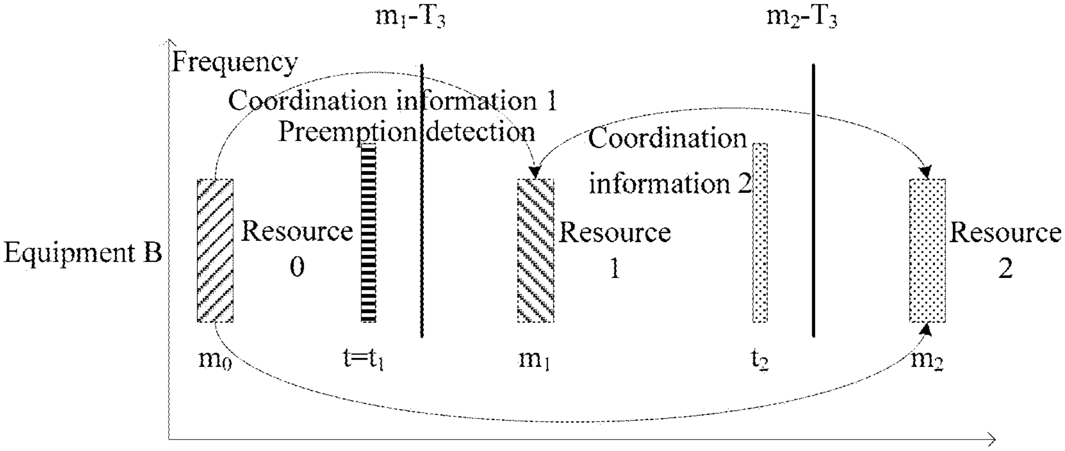
FIG. 14 is another explanatory diagram of whether to receive coordination information of the embodiment of this disclosure.

FIG. 14 is another explanatory diagram of whether to receive the coordination information of the embodiment of this disclosure. For example, FIG. 14 shows a case where the first time interval (d) is equal to 0, in which equipment B detects at slot t whether reserved resource 1 is preempted, and expects to receive coordination information 1 related to resource 1 at slot t.

Based on preemption detection, equipment B determines that there is a need to perform reselection on reserved resource 1. Equipment B may skip receiving coordination information 1 at slot t and perform reselection on resource 1 based on preemption detection, such as performing resource reselection based on a resource reselection method in existing standards; or, equipment B may receive the coordination information but skip performing resource reselection based on the received coordination information, and perform reselection on resource 1 based only on preemption detection; or, equipment B may receive coordination information, perform resource reselection based on the coordination information, and skip performing resource reselection based on preemption detection. That is, when the first time interval (d) is equal to 0, equipment B will not be triggered to perform resource reselection twice, but perform resource reselection only once.

Figure 15:
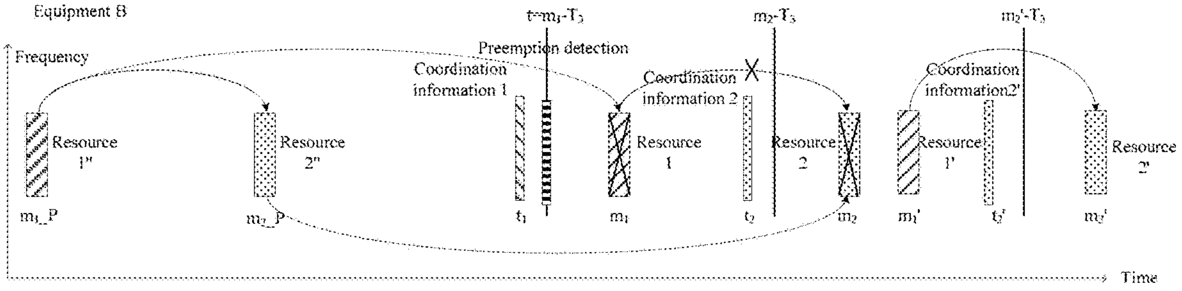
FIG. 15 is a further explanatory diagram of whether to receive coordination information of the embodiment of this disclosure.

FIG. 15 is a further explanatory diagram of whether to receive the coordination information of the embodiment of this disclosure. For example, as shown in FIG. 15, SCI transmitted on initial transmission resource 1" in a previous period (slot $m_1$_P, wherein, P is the period) reserves initial transmission resource 1 of a next period (slot $m_i$) via a period field, reserves retransmission resource 2" of the previous period via a time-frequency resource field, and SCI transmitted on retransmission resource 2" in a previous period reserves retransmission resource 2 of the next period via a period field.

Equipment B does not receive the coordination information at slot $t_1$, detects at slot $t=m_1-T_3$ that resource 1 and resource 2 are preempted, and decides to perform reselection on the reserved resources; for example, resource reselection is performed in a resource reselection method in existing standards, and reselected resources are resource 1' and resource 2'. Equipment B may skip receiving coordination information 2, or, equipment B may receive coordination information 2 but skip performing resource reselection based on received coordination information 2 (receiving coordination information 2 but dropping contents indicated by received coordination information 2).

The above implementation takes preemption detection of some reserved resources at some specific slots as examples. The above operations may be similarly performed in this disclosure in performing preemption detection on other reserved resources at other slots, which is not limited in this disclosure.

In some embodiments, the coordination information may be carried by a physical sidelink feedback channel (PSFCH). For example, when the coordination information is used to indicate reselection, PSFCH resources may be additional configured or preconfigured RB resources, or sequence resources. The sequences here may be determined by such parameters as cyclic shift, etc. For example, the slot where the physical sidelink feedback channel (PSFCH) carrying the coordination information is located is determined according to the above method; however, this disclosure is not limited thereto, and other resources may also be used to carry the coordination information.

In some embodiments, the first terminal equipment is a destination receiving terminal equipment of the second terminal equipment. In some embodiments, the first terminal equipment is not a destination receiving terminal equipment of the second terminal equipment, but the first terminal equipment is a destination receiving terminal equipment of the third terminal equipment. The destination receiving terminal equipment, for example, refers to a receiving equipment that receives PSCCHs/PSSCHs, and this disclosure is not limited thereto.

In some embodiments, the first terminal equipment (equipment A) and the second terminal equipment (equipment B) perform unicast or groupcast or broadcast sidelink communication. That is, the above embodiments may be applicable to any unicast or groupcast or broadcast scenario.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the equipment performs preemption detection on the reserved resources, and determines whether to receive the coordination information indicating that a conflict occurs in the reserved resources according to whether the reserved resources are preempted, and/or determine whether to perform resource reselection based on the received coordination information. Hence, unnecessary resource reselection may be avoided, probabilities of occurrence of conflicts may be reduced, and transmission reliabilities may be improved.

On the one hand, unnecessary resource reselection is avoided, thereby avoiding unnecessary conflicts and improving transmission reliability. On the other hand, as the equipment may avoid unnecessary transmission and reception of the coordination information, probabilities of conflicts between receiving and transmitting the coordination information and/or between receiving coordination information and receiving coordination information may be reduced.

Specifically, taking that the PSFCHs carry the coordination information an as example, when the equipment needs to transmit the PSFCHs and receive the PSFCHs simultaneously, it will drop PSFCHs with lower priorities and only transmit or receive PSFCHs with higher priorities; when the equipment needs to transmit multiple PSFCHs simultaneously and the number of the PSFCHs exceeds the UE capability, the equipment will drop some PSFCHs with lower priorities and only transmit PSFCHs with higher priorities. When the PSFCHs are used to transmit the coordination information, probabilities of occurrence of conflicts between the above receiving PSFCHs/transmitting PSFCHs and/or between transmitting PSFCHs/transmitting PSFCHs is actually increased. In the embodiments of this disclosure, transmission and reception of some PSFCHs carrying the coordination information may be avoided, hence, probabilities of occurrence of conflicts between receiving PSFCHs/transmitting PSFCHs and/or between transmitting and receiving PSFCHs/transmitting PSFCHs may be reduced to some extent.

Embodiments of a Second Aspect

Figure 16:
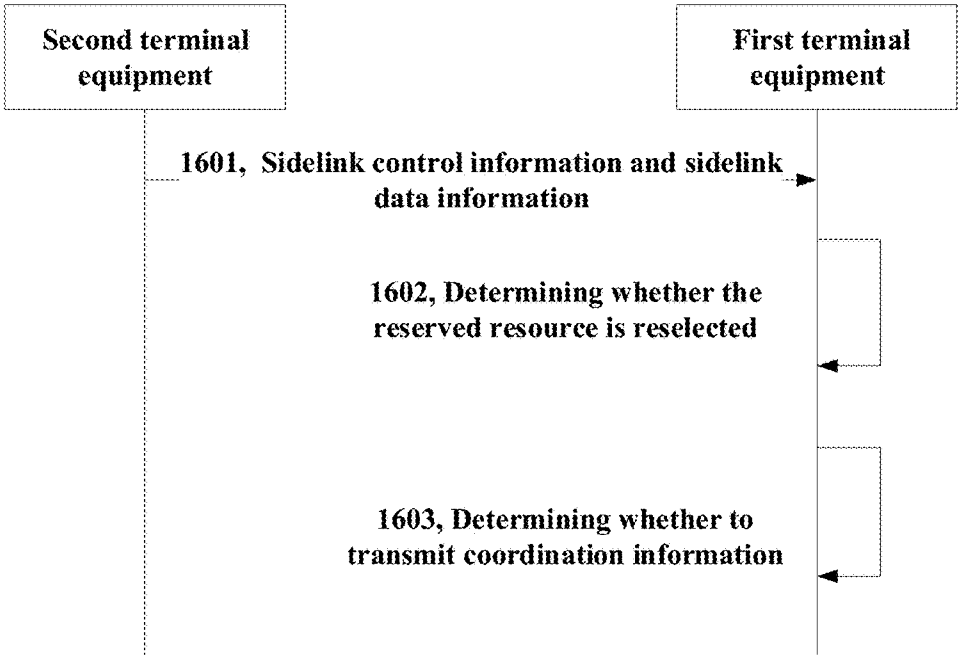
FIG. 16 is a schematic diagram of the inter-UE coordination method of an embodiment of this disclosure.

The embodiment of this disclosure provides an inter-UE coordination method, which shall be described from a first terminal equipment. The embodiments of this disclosure may be implemented in combination with the embodiments of the first aspect, or may be implemented separately, with contents identical to those in the embodiments of the first aspect being not going to be described herein any further. FIG. 16 is a schematic diagram of the inter-UE coordination method of the embodiment of this disclosure. As shown in FIG. 16, the method includes:

1601: the first terminal equipment receives sidelink control information and sidelink data information, the sidelink control information indicating a reserved resource;

1602: the first terminal equipment determines whether the reserved resource is reselected; and

1603: the first terminal equipment determines whether to transmit coordination information used to indicate that a conflict occurs in the reserved resource according to whether the reserved resource is reselected.

It should be noted that FIG. 16 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 16.

In some embodiments, in a case where the reserved resource is not reselected by a second terminal equipment, first coordination information is transmitted to the second terminal equipment, and in a case where the reserved resource is reselected by the second terminal equipment, transmitting the first coordination information to the second terminal equipment is skipped.

Figure 17:
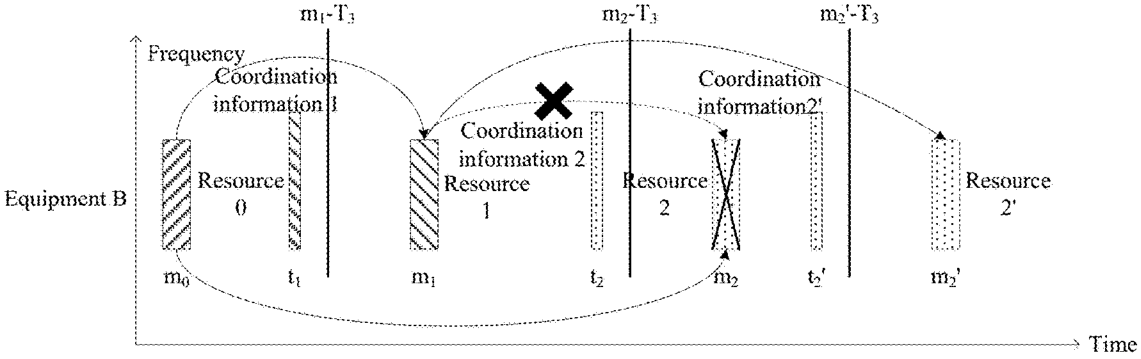
FIG. 17 is an explanatory diagram of whether to transmit coordination information of an embodiment of this disclosure.

FIG. 17 is an explanatory diagram of whether to transmit the coordination information of the embodiment of this disclosure. As shown in FIG. 17, equipment A receives SCI at slot $m_0$ and learns that equipment B has reserved resource 1 and resource 2. According to existing standards, SCI transmitted at resource 1 should also reserve resource 2. However, equipment B finds at slot $m_1-T_3$ that resource 2 is preempted, hence, it reselects resource 2 as resource 2', causing that the SCI of resource 1 reserves resource 2 no longer, and reserves reselected resource 2' instead.

After receiving the SCI transmitted at resource 1, equipment A will find that resource 1 reserves resource 2' but does not reserve resource 2, hence, it infers that resource 2 has been reselected by equipment B. As resource 2 has been reselected by equipment B, equipment A may skip transmitting coordination information 2.

Optionally, equipment B finds at slot $m_1-T_3$ that resource 2 has not been preempted, and does not perform resource reselection, that is, the SCI of resource 1 still reserves resource 2. After receiving the SCI transmitted at resource 1, equipment A will find that resource 1 still reserves resource 2, hence, equipment A proceeds with transmitting coordination information 2 to equipment B.

Figure 18:
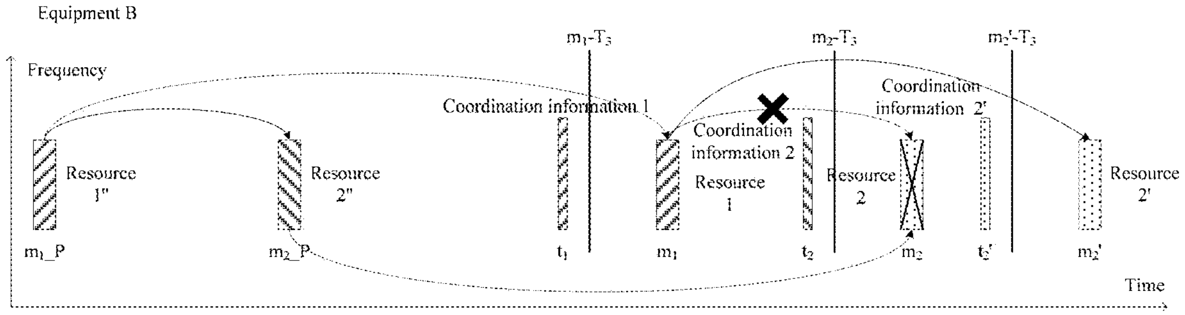
FIG. 18 is another explanatory diagram of whether to transmit coordination information of the embodiment of this disclosure.

FIG. 18 is another explanatory diagram of whether to transmit coordination information of the embodiment of this disclosure. As shown in FIG. 18, equipment A may learn the following information by receiving resource 1" and resource 2": the SCI transmitted on initial transmission resource 1" in a previous period (slot $m_1\_P$, wherein, P is the period) reserves initial transmission resource 1 of a next period (slot $m_1$) via a period field, and reserves retransmission resource 2" of the previous period via a time-frequency resource field, and SCI transmitted on retransmission resource 2" of the previous period reserves retransmission resource 2 of the next period via a period field.

Under normal circumstances, resource 1 reserves resource 2. However, equipment B finds at slot $m_1-T_3$ that resource 2 is preempted, and performs resource reselection. The reselected resource is resource 2', causing the SCI of resource 1 to reserve resource 2 no longer, but reserves reselected resource 2' instead.

After receiving the SCI transmitted at resource 1, equipment A will find that resource 1 reserves resource 2' but does not reserve resource 2, hence, it infers that resource 2 has been reselected by equipment B. As resource 2 has been reselected by equipment B, equipment A may skip transmitting coordination information 2.

Optionally, equipment B finds at slot $m_1-T_3$ that resource 2 has not been preempted, and does not perform resource reselection, that is, the SCI of resource 1 still reserves resource 2. After receiving the SCI transmitted at resource 1, equipment A will find that resource 1 still reserves resource 2, hence, equipment A proceeds with transmitting coordination information 2 to equipment B.

In some embodiments, in the case where the reserved resource is reselected by the second terminal equipment, it is determined that the reserved resource is released, and skipping transmitting to other terminal equipment the second coordination information indicating conflicts occur between other reserved resources and the reserved resource.

In some embodiments, after equipment A determines that a reserved resource is reselected by equipment B, in determining an expected conflict, equipment A deems that the reserved resource is released, that is, it does not treat the reselected resource as a reserved resource. For example, if equipment A finds that a conflict occurs between resource 1 reserved by equipment B and resource 2 reserved by equipment C and determines to transmit coordination information to equipment C to notify of the conflict, but if equipment A finds that resource 1 has been reselected by equipment B, it no longer deems that resource 1 conflicts with resource 2, and therefore does not transmit second coordination information to equipment C.

In some embodiments, the first coordination information and second coordination information are carried by a physical sidelink feedback channel (PSFCH).

In some embodiments, the first terminal equipment and the second terminal equipment perform unicast or groupcast or broadcast sidelink communication. That is, the above embodiments may be applicable to any unicast or groupcast or broadcast scenario.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiment that equipment determines whether to transmit the coordination information indicating that a conflict occurs in the reserved resources according to whether the reserved resources are selected. Hence, unnecessary transmission of coordination information may be avoided, probabilities of occurrence of conflicts may be reduced, and transmission reliabilities may be improved.

On the one hand, unnecessary transmission of coordination information is avoided, thereby avoiding probabilities of occurrence of conflicts, and improving transmission reliabilities. On the other hand, as the equipment may avoid unnecessary transmission and reception of the coordination information, probabilities of conflicts between receiving and transmitting the coordination information and/or between transmitting coordination information and transmitting coordination information may be reduced.

Specifically, taking that the PSFCHs carry the coordination information an as example, when the equipment needs to transmit the PSFCHs and receive the PSFCHs simultaneously, it will drop PSFCHs with lower priorities and only transmit or receive PSFCHs with higher priorities; when the equipment needs to transmit multiple PSFCHs simultaneously and the number of the PSFCHs exceeds the UE capability, the equipment will drop some PSFCHs with lower priorities and only transmit PSFCHs with higher priorities. When the PSFCHs are used to transmit the coordination information, probabilities of occurrence of conflicts between the above receiving PSFCHs/transmitting PSFCHs and/or between transmitting PSFCHs/transmitting PSFCHs is actually increased. In the embodiments of this disclosure, transmission and reception of some PSFCHs carrying the coordination information may be avoided, hence, probabilities of occurrence of conflicts between receiving PSFCHs/transmitting PSFCHs and/or between transmitting and receiving PSFCHs/transmitting PSFCHs may be reduced to some extent.

Embodiments of a Third Aspect

The embodiment of this disclosure provides an inter-UE coordination method, which shall be described from a first terminal equipment and a second terminal equipment. The embodiments of this disclosure may be implemented in combination with the embodiments of the first and second aspects, or may be implemented separately, with contents identical to those in the embodiments of the first and second aspects being not going to be described herein any further.

Figure 19:
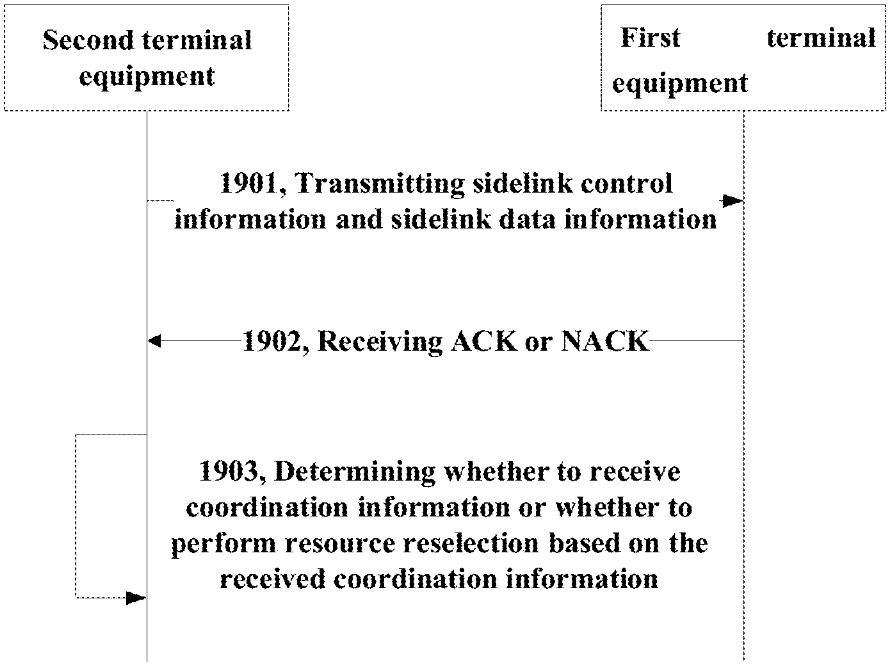
FIG. 19 is a schematic diagram of the inter-UE coordination method of an embodiment of this disclosure.

FIG. 19 is a schematic diagram of the inter-UE coordination method of the embodiment of this disclosure. As shown in FIG. 19, the method includes:

1901: the second terminal equipment transmits sidelink control information and sidelink data information, the sidelink control information indicating a reserved resource;

1902: acknowledgement (ACK) or non-acknowledgement (NACK) fed back for the sidelink transmission indicated by the sidelink control information is received; and

1903: whether to receive coordination information indicating that a conflict occurs in the reserved resource is determined, or whether to perform resource reselection based on the received coordination information is determined, according to whether the acknowledgement (ACK) has been received.

It should be noted that FIG. 19 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 19.

In some embodiments, in a case where the ACK has been received before receiving the coordination information, skipping receiving the coordination information or skipping performing resource reselection based on the received coordination information. In a case where the ACK is not received before receiving the coordination information and the reserved resource is not preempted, determining to receive the coordination information or performing resource reselection based on the received coordination information; and in a case where the ACK is not received before receiving the coordination information and the reserved resource is preempted, determining to skip receiving the coordination information or skip performing resource reselection based on the received coordination information.

Figure 20:
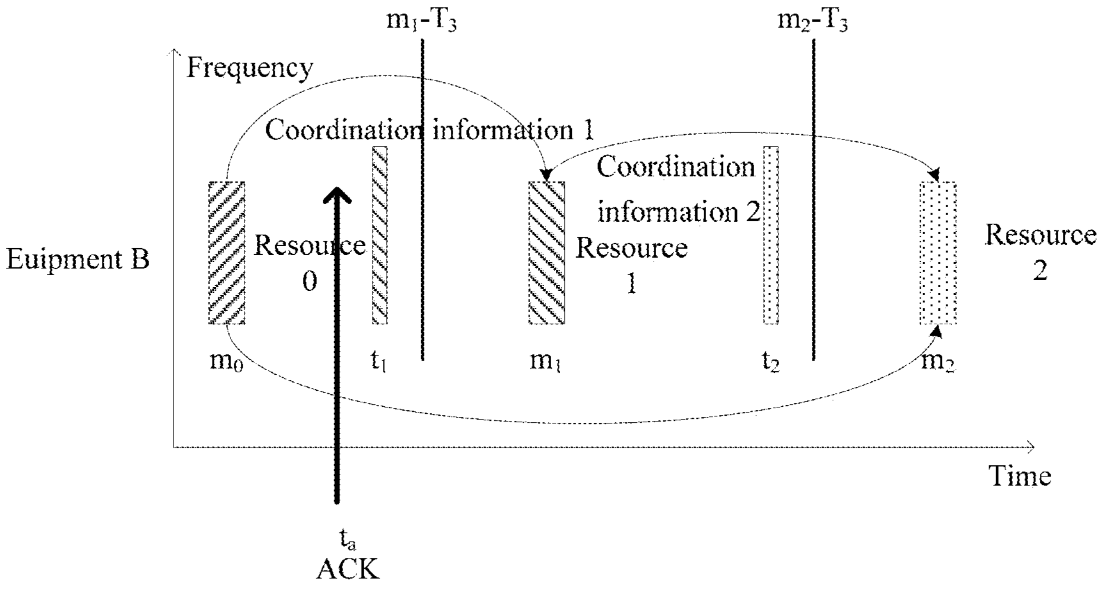
FIG. 20 is an explanatory diagram of whether to receive coordination information of an embodiment of this disclosure.

FIG. 20 is an explanatory diagram of whether to receive the coordination information of the embodiment of this disclosure. As shown in FIG. 20, in a case where equipment B has already received the ACK at slot ta before receiving coordination information 1, it skips receiving coordination information 1 or skips performing resource reselection based on received coordination information 1.

Figure 21:
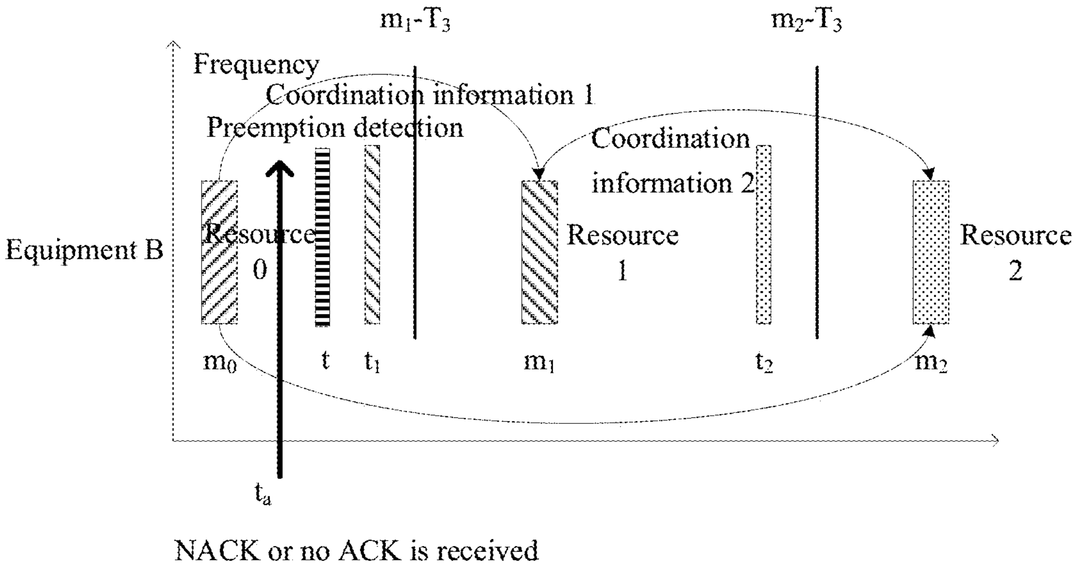
FIG. 21 is another explanatory diagram of whether to receive coordination information of the embodiment of this disclosure.

FIG. 21 is another explanatory diagram of whether to receive the coordination information of the embodiment of this disclosure. As shown in FIG. 21, equipment B does not receive the ACK or receives the NACK at slot ta before receiving coordination information 1, equipment B detects whether reserved resource 1 is preempted at slot t, and in a case where reserved resource 1 is not preempted, it determines to receive coordination information 1, and determines to perform resource reselection based on received coordination information 1; and in a case where reserved resource 1 is preempted, it determines to skip receiving coordination information 1 or skip performing resource reselection based on received coordination information 1.

In some embodiments, reference may be made to the embodiments of the first aspect for other implementations in which equipment B does not receive the ACK or receives the NACK at slot ta before receiving coordination information 1, which shall not be repeated herein any further.

In some embodiments, the ACK and coordination information are for the same transport block (TB). As equipment B has received the ACK, it will not transmit at the reserved resources related to the coordination information, nor will perform resource reselection on the reserved resources. Therefore, receiving the coordination information or performing resource reselection based on the received coordination information may be skipped. In some embodiments, equipment B actually refers, to any equipment that is able to receive the coordination information.

In some embodiments, behaviors of equipment B are used for unicast and groupcast.

In some embodiments, the above behaviors of equipment B are used for unicast and groupcast with HARQ option 2, but not for groupcast with HARQ option 1. This is because the groupcast with HARQ option 1 is groupcast that feeds back NACK only, and equipment B is unable to distinguish between the ACK and DTX. For the DTX, equipment B may actually proceed with receiving the coordination information, and perform resource reselection based on the coordination information.

In some embodiments, the PSFCH indicating the ACK/NACK may reuse the existing standards.

Assuming that equipment A is a receiver of equipment B, after receiving the PSCCH/PSSCH of equipment B, equipment A decides to indicate ACK/NACK and/or reselection to equipment B, and transmits one or more PSFCHs corresponding thereto.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiment that the equipment receives the acknowledgement (ACK) or the nonacknowledgement (NACK) fed back for the sidelink transmission indicated by the sidelink control information, and determines whether to receive the coordination information indicating that a conflict occurs in the reserved resources or whether to perform resource reselection based on the received coordination information according to whether the acknowledgement (ACK) is received. Hence, unnecessary resource reselection may be avoided, probabilities of occurrence of conflicts may be reduced, and transmission reliabilities may be improved.

On the one hand, unnecessary resource reselection is avoided, thereby avoiding unnecessary conflicts and improving transmission reliability. On the other hand, as the equipment may avoid unnecessary transmission and reception of the coordination information, probabilities of conflicts between receiving and transmitting the coordination information and/or between transmitting coordination information and transmitting coordination information may be reduced.

Specifically, taking that the PSFCHs carry the coordination information an as example, when the equipment needs to transmit the PSFCHs and receive the PSFCHs simultaneously, it will drop PSFCHs with lower priorities and only transmit or receive PSFCHs with higher priorities; when the equipment needs to transmit multiple PSFCHs simultaneously and the number of the PSFCHs exceeds the UE capability, the equipment will drop some PSFCHs with lower priorities and only transmit PSFCHs with higher priorities. When the PSFCHs are used to transmit the coordination information, probabilities of occurrence of conflicts between the above receiving PSFCHs/transmitting PSFCHs and/or between transmitting PSFCHs/transmitting PSFCHs is actually increased. In the embodiments of this disclosure, transmission and reception of some PSFCHs carrying the coordination information may be avoided, hence, probabilities of occurrence of conflicts between receiving PSFCHs/transmitting PSFCHs and/or between transmitting and receiving PSFCHs/transmitting PSFCHs may be reduced to some extent.

Embodiments of a Fourth Aspect

The embodiment of this disclosure provides an inter-UE coordination method, which shall be described from a first terminal equipment. The embodiments of this disclosure may be implemented in combination with the embodiments of the first, second and third aspects, or may be implemented separately.

Figure 22:
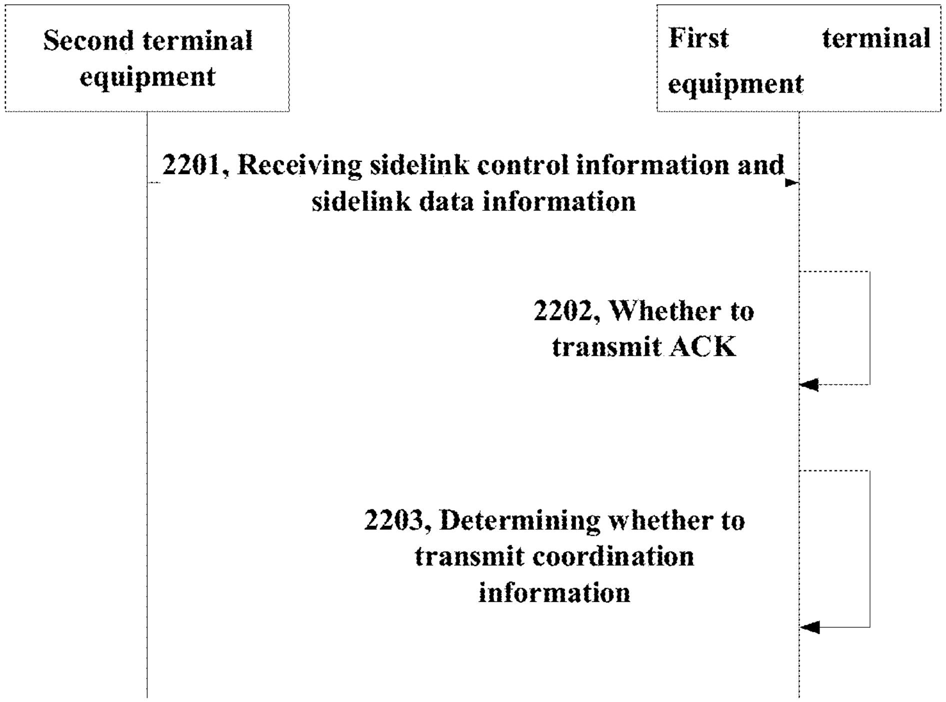
FIG. 22 is a schematic diagram of the inter-UE coordination method of an embodiment of this disclosure.

FIG. 22 is a schematic diagram of the inter-UE coordination method of the embodiment of this disclosure. As shown in FIG. 22, the method includes:

2201: a first terminal equipment receives sidelink control information and sidelink data information, the sidelink control information indicating a reserved resource;

2202: whether to feed back acknowledgement (ACK) for sidelink transmission to which the sidelink control information corresponds is determined; and

2203: whether to transmit coordination information used to indicate that a conflict occurs in the reserved resource is determined according to whether to feed back acknowledgement (ACK).

It should be noted that FIG. 22 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 22.

In some embodiments, in a case where the acknowledgement (ACK) is fed back for sidelink transmission indicated by the sidelink control information, skipping transmitting the first coordination information to the second terminal equipment. In some embodiments, for a reserved resource where the acknowledged (ACK) is transmitted, it is determined that the reserved resource is released, and skipping transmitting the second coordination information indicating that a conflict occurs between other reserved resources and the reserved resource to other terminal equipment.

Figure 23:
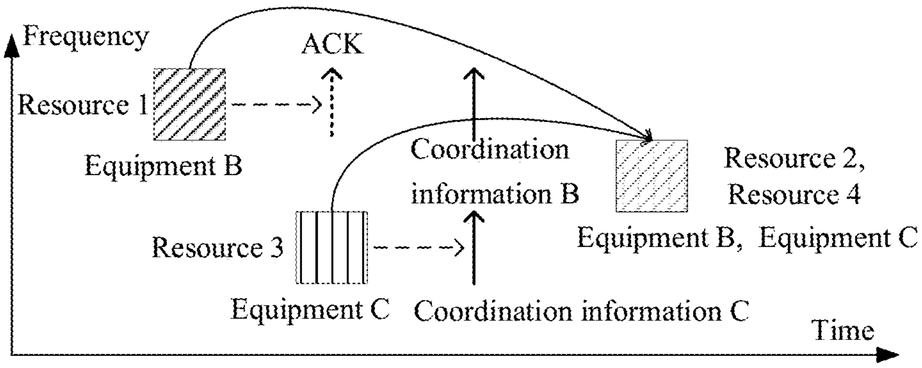
FIG. 23 is an explanatory diagram of whether to transmit coordination information of the embodiment of this disclosure.

FIG. 23 is an explanatory diagram of whether to transmit the coordination information of the embodiment of this disclosure. As shown in FIG. 23, if equipment A indicates the ACK to equipment B for sidelink data information transmitted at resource 1 before transmitting the coordination information, equipment A may skip transmitting first coordination information B indicating the expected conflict, that is, the first coordination information B indicating the expected conflict is not transmitted.

In some embodiments, for a reserved resource after the ACK is indicated, equipment A deems that the reserved resource is released in determining the expected conflict, that is, it does not treat the reselected resource as a reserved resource.

In some embodiments, as shown in FIG. 23, equipment A finds that a conflict occurs between resource 2 reserved by equipment B and resource 4 reserved by equipment C, and determines to transmit second coordination information C to equipment C to notify of the conflict. However, if equipment A finds that itself has indicates the ACK to equipment B for the sidelink data information transmitted at resource 1, leading to that resource 2 will not be used by equipment B to transmit retransmission, equipment A no longer deems that resource 2 conflicts with resource 4, hence it will not transmit second coordination information C to equipment C.

In some embodiments, the ACK and the first coordination information are for the same TB.

In some embodiments, behaviors of equipment A are used for unicast and groupcast. In some embodiments, the unicast or groupcast refers to that a PSSCH addressed by the ACK belongs to unicast or groupcast. Equipment A is able to learn via the SCI ($2^{nd}$ stage SCI) that the PSSCH belongs to unicast or groupcast, or belongs to groupcast with HARQ option 1 or groupcast with HARQ option 2.

In some embodiments, the above behaviors of equipment A are used for unicast but not for groupcast. This is because for groupcast, equipment B may possibly receive NACK transmitted by other member than equipment A. Hence, equipment B will still perform retransmission at the reserved resource. If equipment A does not transmit coordination information, it may cause equipment A to be unable to correctly receive retransmission from equipment B or equipment C.

In some embodiments, indicating the ACK by equipment A to equipment B refers to that equipment A has determined the ACK and does not drop the ACK according to a priority rule, that is, equipment A has actually transmitted the ACK. For groupcast with HARQ option 1, as equipment A only transmits a PSFCH in NACK and does not transmit a PSFCH in ACK, not transmitting a PSFCH is deemed as indicating the ACK to equipment B.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the equipment determines whether to feed back acknowledgement (ACK) for sidelink transmission to which the sidelink control information corresponds, and determine whether to transmit the coordination information indicating that a conflict occurs in the reserved resources according to whether the acknowledgement (ACK) is fed back. Hence, unnecessary resource reselection may be avoided, probabilities of occurrence of conflicts may be reduced, and transmission reliabilities may be improved.

On the one hand, unnecessary resource reselection is avoided, thereby avoiding unnecessary conflicts and improving transmission reliability. On the other hand, as the equipment may avoid unnecessary transmission and reception of the coordination information, probabilities of conflicts between receiving and transmitting the coordination information and/or between transmitting coordination information and transmitting coordination information may be reduced.

Specifically, taking that the PSFCHs carry the coordination information an as example, when the equipment needs to transmit the PSFCHs and receive the PSFCHs simultaneously, it will drop PSFCHs with lower priorities and only transmit or receive PSFCHs with higher priorities; when the equipment needs to transmit multiple PSFCHs simultaneously and the number of the PSFCHs exceeds the UE capability, the equipment will drop some PSFCHs with lower priorities and only transmit PSFCHs with higher priorities. When the PSFCHs are used to transmit the coordination information, probabilities of occurrence of conflicts between the above receiving PSFCHs/transmitting PSFCHs and/or between transmitting PSFCHs/transmitting PSFCHs is actually increased. In the embodiments of this disclosure, transmission and reception of some PSFCHs carrying the coordination information may be avoided, hence, probabilities of occurrence of conflicts between receiving PSFCHs/transmitting PSFCHs and/or between transmitting and receiving PSFCHs/transmitting PSFCHs may be reduced to some extent.

Embodiments of a Fifth Aspect

The embodiment of this disclosure provides an inter-UE coordination apparatus. The apparatus may be, for example, a terminal equipment (such as the above-described second terminal equipment), or may be one or more components or assemblies configured in a terminal equipment. Contents in this embodiment identical to those in the embodiments of the first to the fourth aspects shall not be described herein any further.

Figure 24:
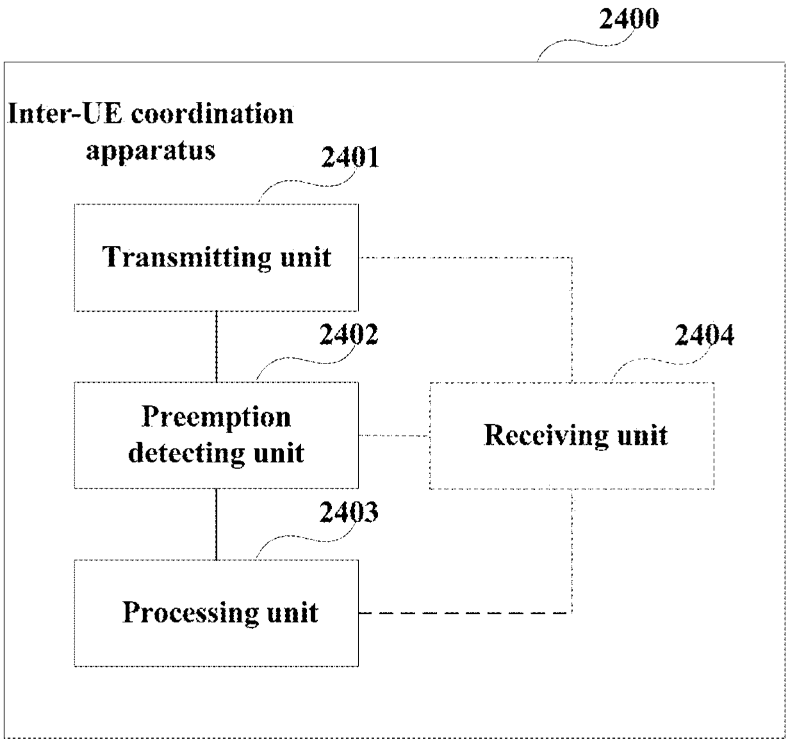
FIG. 24 is a schematic diagram of the inter-UE coordination apparatus of an embodiment of this disclosure.

FIG. 24 is a schematic diagram of the inter-UE coordination apparatus of the embodiment of this disclosure. As shown in FIG. 24, the inter-UE coordination apparatus 2400 includes: a transmitting unit 2401, a preemption detecting unit 2402 and a processing unit 2403.

In some embodiments, the transmitting unit 2401 is configured to transmit sidelink control information and sidelink data information, the sidelink control information indicating a reserved resource; the preemption detecting unit 2402 is configured to perform preemption detection on the reserved resource; and the processing unit 2403 is configured to determine whether to receive coordination information used to indicate that a conflict occurs in the reserved resource, and/or determine whether to perform resource reselection based on the received coordination information, according to whether the reserved resource is preempted.

In some embodiments, the inter-UE coordination apparatus 2400 may further include a receiving unit 2404 configured to receive coordination information from a first terminal equipment.

In some embodiments, in a case where the reserved resource is not preempted, the processing unit 2403 determines to receive the coordination information, and determines to perform the resource reselection based on the received coordination information, and in a case where the reserved resource is preempted, the processing unit 2403 determines to skip receiving the coordination information or skip performing the resource reselection based on the received coordination information. In the case where the reserved resource is preempted, the processing unit 2403 determines to skip receiving the coordination information or skip performing the resource reselection based on the received coordination information.

In some embodiments, at a second slot prior to a first time interval of a first slot receiving the coordination information, the preemption detecting unit 2402 detects whether the reserved resource is preempted, wherein the first time interval is greater than or equal to 0.

In some embodiments, the reserved resources are indicated by frequency resource assignment and time resource assignment field or a resource reservation period field in the sidelink control information.

In some embodiments, there exists a second time interval between the reserved resource and at least one piece of sidelink control information indicating the reserved resource, and there exists a receiving slot of the coordination information within the second time interval.

In some embodiments, the second time interval includes a third time interval and a fourth time interval. The third time interval is a time interval between the reserved resource and a receiving slot of the corresponding coordination information, and the fourth time interval is an interval between the receiving slot of the coordination information and the sidelink control information indicating the reserved resource. The third time interval is greater than or equal to a threshold in units of logical slots.

In some embodiments, on the premise that the third time interval is satisfied, the receiving slot of the coordination information corresponding to the reserved resource is a slot where a physical sidelink feedback channel is located most close to a slot where the reserved resource is located. In some embodiments, the fourth time interval is determined based on a UE capability or UE implementation.

In some embodiments, the inter-UE coordination apparatus 2400 further includes a receiving unit 2404 configured to receive acknowledgement (ACK) or nonacknowledgement (NACK) fed back for sidelink transmission, and the processing unit 2403 is further configured to determine whether to receive the coordination information, or determine whether to perform the resource reselection based on the received coordination information, according to whether the ACK has been received before the coordination information is received.

In a case where the ACK has been received before the coordination information is received, the processing unit 2403 determines to skip receiving the coordination information or skip performing the resource reselection based on the received coordination information. In a case where the ACK has not been received before the coordination information is received and the reserved resource is not preempted, the processing unit 2403 determines to receive the coordination information or determines to perform the resource reselection based on the received coordination information; and in a case where the ACK has not been received before the coordination information is received and the reserved resource is preempted, the processing unit 2403 determines to skip receiving the coordination information or skip performing the resource reselection based on the received coordination information.

In some embodiments, sidelink transmission indicated by the sidelink control information is of unicast, groupcast or broadcast.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the inter-UE coordination apparatus 2400 may further include other components or modules, and reference may be made to related techniques for particulars of these components or modules.

Furthermore, for the sake of simplicity, connection relationships between the components or modules or signal profiles thereof are only illustrated in FIG. 24. However, it should be understood by those skilled in the art that such related techniques as bus connection, etc., may be adopted. And the above components or modules may be implemented by hardware, such as a processor, a memory, a transmitter, and a receiver, etc., which are not limited in the embodiments of this disclosure.

It can be seen from the above embodiment that the equipment performs preemption detection on the reserved resources, and determines whether to receive the coordination information indicating that a conflict occurs in the reserved resources and/or determine whether to perform resource reselection based on the received coordination information according to whether the reserved resources are preempted. Hence, unnecessary resource reselection may be avoided, probabilities of occurrence of conflicts may be reduced, and transmission reliabilities may be improved.

On the one hand, unnecessary resource reselection is avoided, thereby avoiding unnecessary conflicts and improving transmission reliability. On the other hand, as the equipment may avoid unnecessary transmission and reception of the coordination information, probabilities of conflicts between receiving and transmitting the coordination information and/or between receiving coordination information and receiving coordination information may be reduced.

Specifically, taking that the PSFCHs carry the coordination information an as example, when the equipment needs to transmit the PSFCHs and receive the PSFCHs simultaneously, it will drop PSFCHs with lower priorities and only transmit or receive PSFCHs with higher priorities; when the equipment needs to transmit multiple PSFCHs simultaneously and the number of the PSFCHs exceeds the UE capability, the equipment will drop some PSFCHs with lower priorities and only transmit PSFCHs with higher priorities. When the PSFCHs are used to transmit the coordination information, probabilities of occurrence of conflicts between the above receiving PSFCHs/transmitting PSFCHs and/or between transmitting PSFCHs/transmitting PSFCHs is actually increased. In the embodiments of this disclosure, transmission and reception of some PSFCHs carrying the coordination information may be avoided, hence, probabilities of occurrence of conflicts between receiving PSFCHs/transmitting PSFCHs and/or between transmitting and receiving PSFCHs/transmitting PSFCHs may be reduced to some extent.

Embodiments of a Sixth Aspect

The embodiment of this disclosure provides an inter-UE coordination apparatus. The apparatus may be, for example, a terminal equipment (such as the above-described first terminal equipment), or may be one or more components or assemblies configured in a terminal equipment. Contents in this embodiment identical to those in the embodiments of the first to the fifth aspects shall not be described herein any further.

Figure 25:
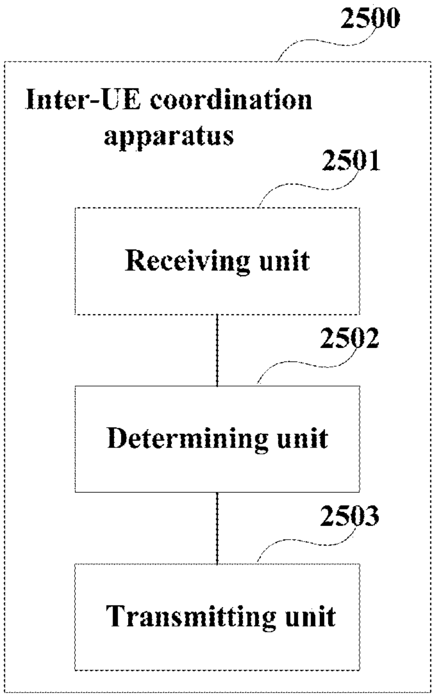
FIG. 25 is a schematic diagram of the inter-UE coordination apparatus of an embodiment of this disclosure.

FIG. 25 is a schematic diagram of the inter-UE coordination apparatus of the embodiment of this disclosure. As shown in FIG. 25, the inter-UE coordination apparatus 2500 includes: a receiving unit 2501, a determining unit 2502 and a transmitting unit 2503.

In some embodiments, the receiving unit 2501 receives sidelink control information and sidelink data information, the sidelink control information indicating a reserved resource; the determining unit 2502 determines whether the reserved resource is reselected; and the transmitting unit 2503 determines whether to transmit coordination information used to indicate that a conflict occurs in the reserved resource according to whether the reserved resource is reselected.

In some embodiments, in a case where the reserved resource is not reselected by a second terminal equipment, the transmitting unit 2503 transmits first coordination information to the second terminal equipment.

In some embodiments, in a case where the reserved resource is reselected by the second terminal equipment, the transmitting unit 2503 skips transmitting the first coordination information to the second terminal equipment. In some embodiments, in a case where the reserved resource is reselected by the second terminal equipment, the determining unit 2502 determines that the reserved resource is released, and the transmitting unit 2503 skips transmitting second coordination information to other terminal equipment, the second coordination information being used to indicate that other reserved resources conflict with the reserved resource.

In some embodiments, in a case where acknowledgement (ACK) is fed back for sidelink transmission indicated by the sidelink control information from a second terminal equipment, the transmitting unit 2503 skips transmitting first coordination information to the second terminal equipment. In some embodiments, in a case where acknowledgement (ACK) is fed back for sidelink transmission indicated by the sidelink control information from a second terminal equipment, the determining unit 2502 determines that the reserved resource is released, and the transmitting unit 2503 skips transmitting second coordination information used to indicate that other reserved resources conflicts with the reserved resource to other terminal equipment.

In some embodiments, the determining unit 2502 determines whether the reserved resource is reselected at a second slot with a first time interval prior to a first slot at which the coordination information is transmitted, wherein the first time interval is larger than or equal to zero.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the inter-UE coordination apparatus 2500 may further include other components or modules, and reference may be made to related techniques for particulars of these components or modules.

Furthermore, for the sake of simplicity, connection relationships between the components or modules or signal profiles thereof are only illustrated in FIG. 25. However, it should be understood by those skilled in the art that such related techniques as bus connection, etc., may be adopted. And the above components or modules may be implemented by hardware, such as a processor, a memory, a transmitter, and a receiver, etc., which are not limited in the embodiments of this disclosure.

It can be seen from the above embodiment that equipment determines whether to transmit the coordination information indicating that a conflict occurs in the reserved resources according to whether the reserved resources are selected. Hence, unnecessary transmission of coordination information may be avoided, probabilities of occurrence of conflicts may be reduced, and transmission reliabilities may be improved.

On the one hand, unnecessary transmission of coordination information is avoided, thereby avoiding probabilities of occurrence of conflicts, and improving transmission reliabilities. On the other hand, as the equipment may avoid unnecessary transmission and reception of the coordination information, probabilities of conflicts between receiving and transmitting the coordination information and/or between transmitting coordination information and transmitting coordination information may be reduced.

Specifically, taking that the PSFCHs carry the coordination information an as example, when the equipment needs to transmit the PSFCHs and receive the PSFCHs simultaneously, it will drop PSFCHs with lower priorities and only transmit or receive PSFCHs with higher priorities; when the equipment needs to transmit multiple PSFCHs simultaneously and the number of the PSFCHs exceeds the UE capability, the equipment will drop some PSFCHs with lower priorities and only transmit PSFCHs with higher priorities. When the PSFCHs are used to transmit the coordination information, probabilities of occurrence of conflicts between the above receiving PSFCHs/transmitting PSFCHs and/or between transmitting PSFCHs/transmitting PSFCHs is actually increased. In the embodiments of this disclosure, transmission and reception of some PSFCHs carrying the coordination information may be avoided, hence, probabilities of occurrence of conflicts between receiving PSFCHs/transmitting PSFCHs and/or between transmitting and receiving PSFCHs/transmitting PSFCHs may be reduced to some extent.

Embodiments of a Seventh Aspect

The embodiment of this disclosure provides an inter-UE coordination apparatus. The apparatus may be, for example, a terminal equipment (such as the above-described first terminal equipment), or may be one or more components or assemblies configured in a terminal equipment. Contents in this embodiment identical to those in the embodiments of the first to the sixth aspects shall not be described herein any further.

Figure 26:
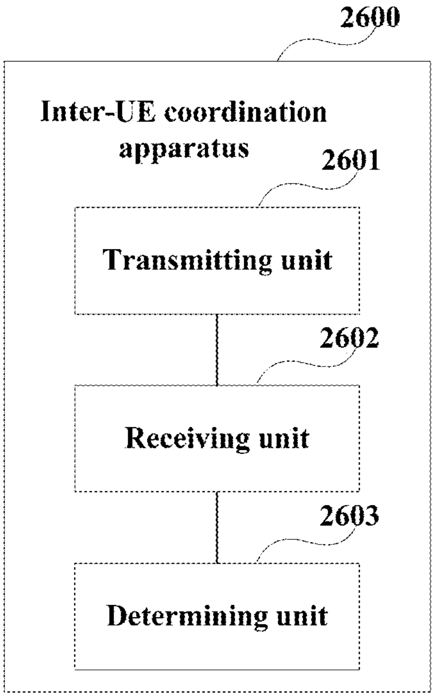
FIG. 26 is a schematic diagram of the inter-UE coordination apparatus of an embodiment of this disclosure.

FIG. 26 is a schematic diagram of the inter-UE coordination apparatus of the embodiment of this disclosure. As shown in FIG. 26, the inter-UE coordination apparatus 2600 includes: a transmitting unit 2601, a receiving unit 2602 and a determining unit 2603.

In some embodiments, the transmitting unit 2601 transmits sidelink control information and sidelink data information, the sidelink control information indicating a reserved resource; the receiving unit 2602 receives acknowledgement (ACK) or non-acknowledgement (NACK) fed back for the sidelink transmission indicated by the sidelink control information; and the determining unit 2603 determines whether to receive coordination information indicating that a conflict occurs in the reserved resource, or determines whether to perform resource reselection based on the received coordination information, according to whether the acknowledgement (ACK) has been received.

In some embodiments, in a case where ACK has been received before receiving the coordination information, the determining unit 2603 determines to skip receiving the coordination information or to skip performing resource reselection based on the received coordination information.

In some embodiments, in a case where ACK is not received before receiving the coordination information and reserved resources are not preempted, the determining unit 2603 determines to receive the coordination information or perform resource reselection based on the received coordination information; and in a case where the ACK is not received before receiving the coordination information and the reserved resource is preempted, the determining unit 2603 determines to skip receiving the coordination information or skip performing resource reselection based on the received coordination information.

In some embodiments, sidelink transmission indicated by the sidelink control information is of unicast, groupcast or broadcast.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the inter-UE coordination apparatus 2600 may further include other components or modules, and reference may be made to related techniques for particulars of these components or modules.

Furthermore, for the sake of simplicity, connection relationships between the components or modules or signal profiles thereof are only illustrated in FIG. 26. However, it should be understood by those skilled in the art that such related techniques as bus connection, etc., may be adopted. And the above components or modules may be implemented by hardware, such as a processor, a memory, a transmitter, and a receiver, etc., which are not limited in the embodiments of this disclosure.

It can be seen from the above embodiment that the equipment receives the acknowledgement (ACK) or the nonacknowledgement (NACK) fed back for the sidelink transmission indicated by the sidelink control information, and determines whether to receive the coordination information indicating that a conflict occurs in the reserved resources or whether to perform resource reselection based on the received coordination information according to whether the acknowledgement (ACK) is received. Hence, unnecessary resource reselection may be avoided, probabilities of occurrence of conflicts may be reduced, and transmission reliabilities may be improved.

On the one hand, unnecessary resource reselection is avoided, thereby avoiding unnecessary conflicts and improving transmission reliability. On the other hand, as the equipment may avoid unnecessary transmission and reception of the coordination information, probabilities of conflicts between receiving and transmitting the coordination information and/or between transmitting coordination information and transmitting coordination information may be reduced.

Specifically, taking that the PSFCHs carry the coordination information an as example, when the equipment needs to transmit the PSFCHs and receive the PSFCHs simultaneously, it will drop PSFCHs with lower priorities and only transmit or receive PSFCHs with higher priorities; when the equipment needs to transmit multiple PSFCHs simultaneously and the number of the PSFCHs exceeds the UE capability, the equipment will drop some PSFCHs with lower priorities and only transmit PSFCHs with higher priorities. When the PSFCHs are used to transmit the coordination information, probabilities of occurrence of conflicts between the above receiving PSFCHs/transmitting PSFCHs and/or between transmitting PSFCHs/transmitting PSFCHs is actually increased. In the embodiments of this disclosure, transmission and reception of some PSFCHs carrying the coordination information may be avoided, hence, probabilities of occurrence of conflicts between receiving PSFCHs/transmitting PSFCHs and/or between transmitting and receiving PSFCHs/transmitting PSFCHs may be reduced to some extent.

Embodiments of an Eighth Aspect

The embodiment of this disclosure provides an inter-UE coordination apparatus. The apparatus may be, for example, a terminal equipment (such as the above-described first terminal equipment), or may be one or more components or assemblies configured in a terminal equipment. Contents in this embodiment identical to those in the embodiments of the first to the seventh aspects shall not be described herein any further.

Figure 27:
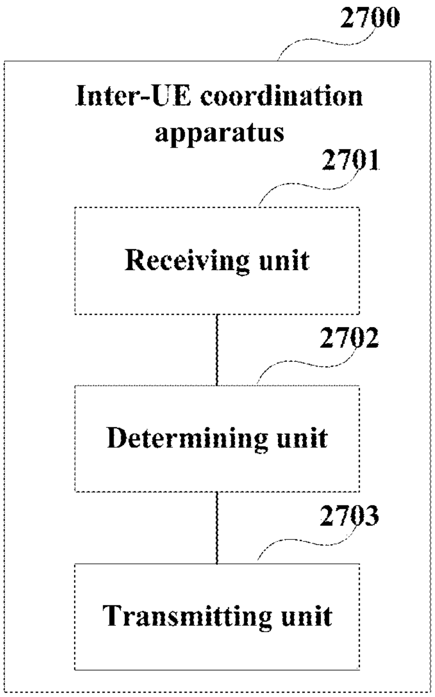
FIG. 27 is a schematic diagram of the inter-UE coordination apparatus of an embodiment of this disclosure.

FIG. 27 is a schematic diagram of the inter-UE coordination apparatus of the embodiment of this disclosure. As shown in FIG. 27, the inter-UE coordination apparatus 2700 includes: a receiving unit 2701, a determining unit 2702 and a transmitting unit 2703.

In some embodiments, the receiving unit 2701 receives sidelink control information and sidelink data information, the sidelink control information indicating a reserved resource; the determining unit 2702 determines whether to feed back acknowledgement (ACK) for the sidelink transmission to which the sidelink control information corresponds; and the transmitting unit 2703 determines whether to transmit coordination information used to indicate that a conflict occurs in the reserved resource according to whether the acknowledgement (ACK) is fed back.

In some embodiments, in a case where the acknowledgement (ACK) is fed back for sidelink transmission indicated by the sidelink control information, the transmitting unit 2703 skips transmitting the first coordination information to the second terminal equipment.

In some embodiments, for a reserved resource where the acknowledged (ACK) is transmitted, the determining unit 2702 determines that the reserved resource is released, and the transmitting unit 2703 skips transmitting the second coordination information indicating that a conflict occurs between other reserved resources and the reserved resource to other terminal equipment.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the inter-UE coordination apparatus 2700 may further include other components or modules, and reference may be made to related techniques for particulars of these components or modules.

Furthermore, for the sake of simplicity, connection relationships between the components or modules or signal profiles thereof are only illustrated in FIG. 27. However, it should be understood by those skilled in the art that such related techniques as bus connection, etc., may be adopted. And the above components or modules may be implemented by hardware, such as a processor, a memory, a transmitter, and a receiver, etc., which are not limited in the embodiments of this disclosure.

It can be seen from the above embodiments that the equipment receives the acknowledgement (ACK) fed back for the sidelink transmission to which the sidelink control information corresponds, and determines whether to transmit the coordination information indicating that a conflict occurs in the reserved resources according to whether the acknowledgement (ACK) is fed back. Hence, unnecessary resource reselection may be avoided, probabilities of occurrence of conflicts may be reduced, and transmission reliabilities may be improved.

On the one hand, unnecessary resource reselection is avoided, thereby avoiding unnecessary conflicts and improving transmission reliability. On the other hand, as the equipment may avoid unnecessary transmission and reception of the coordination information, probabilities of conflicts between receiving and transmitting the coordination information and/or between transmitting coordination information and transmitting coordination information may be reduced.

Specifically, taking that the PSFCHs carry the coordination information an as example, when the equipment needs to transmit the PSFCHs and receive the PSFCHs simultaneously, it will drop PSFCHs with lower priorities and only transmit or receive PSFCHs with higher priorities; when the equipment needs to transmit multiple PSFCHs simultaneously and the number of the PSFCHs exceeds the UE capability, the equipment will drop some PSFCHs with lower priorities and only transmit PSFCHs with higher priorities. When the PSFCHs are used to transmit the coordination information, probabilities of occurrence of conflicts between the above receiving PSFCHs/transmitting PSFCHs and/or between transmitting PSFCHs/transmitting PSFCHs is actually increased. In the embodiments of this disclosure, transmission and reception of some PSFCHs carrying the coordination information may be avoided, hence, probabilities of occurrence of conflicts between receiving PSFCHs/transmitting PSFCHs and/or between transmitting and receiving PSFCHs/transmitting PSFCHs may be reduced to some extent.

Embodiments of a Ninth Aspect

The embodiment of this disclosure provides a communication system, and reference may be made to FIG. 1, with contents identical to those in the embodiments of the first to the eighth aspects being not going to be described herein any further.

In some embodiments, the communication system 100 may at least include:

a terminal equipment configured to transmit sidelink control information and sidelink data information, the sidelink control information indicating a reserved resource; perform preemption detection on the reserved resource; and determine whether to receive coordination information used to indicate that a conflict occurs in the reserved resource, and/or determine whether to perform resource reselection based on the received coordination information, according to whether the reserved resource is preempted.

In some embodiments, the communication system 100 may at least include:

a terminal equipment configured to receive sidelink control information and sidelink data information, the sidelink control information indicating a reserved resource; determine whether the reserved resource is reselected; and determine whether to transmit coordination information used to indicate that a conflict occurs in the reserved resource according to whether the reserved resource is reselected.

In some embodiments, the communication system 100 may at least include:

a terminal equipment configured to transmit sidelink control information and sidelink data information, the sidelink control information indicating a reserved resource; receive acknowledgement (ACK) or non-acknowledgement (NACK) fed back for the sidelink transmission indicated by the sidelink control information; and determine whether to receive coordination information indicating that a conflict occurs in the reserved resource, and/or determine whether to perform resource reselection based on the received coordination information, according to whether the acknowledgement (ACK) has been received.

In some embodiments, the communication system 100 may at least include:

a terminal equipment configured to receive sidelink control information and sidelink data information, the sidelink control information indicating a reserved resource; determine whether to feed back acknowledgement (ACK) for the sidelink transmission to which the sidelink control information corresponds; and determine whether to transmit coordination information used to indicate that a conflict occurs in the reserved resource according to whether the acknowledgement (ACK) is fed back.

The embodiment of this disclosure further provides a network device, which may be, for example, a base station. However, this disclosure is not limited thereto, and it may also be another network device.

Figure 28:
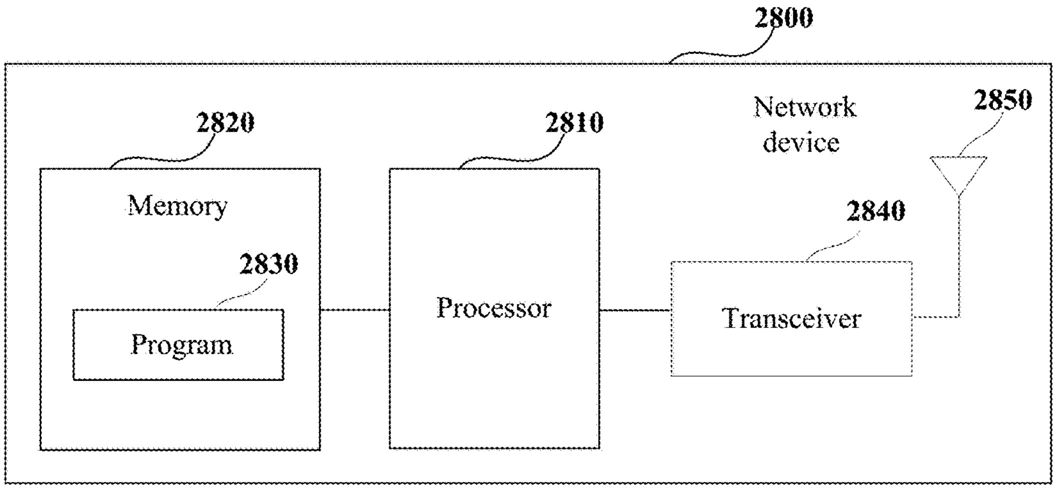
FIG. 28 is a schematic diagram of the network device of an embodiment of this disclosure.

FIG. 28 is a schematic diagram of a structure of the network device of the embodiment of this disclosure. As shown in FIG. 28, the network device 2800 may include a processor 2810 (such as a central processing unit (CPU)) and a memory 2820, the memory 2820 being coupled to the processor 2810. Wherein, the memory 2820 may store various data, and furthermore, it may store a program 2830 for information processing, and execute the program 2830 under control of the processor 2810.

Furthermore, as shown in FIG. 28, the network device 2800 may include a transceiver 2840, and an antenna 2850, etc. Wherein, functions of the above components are similar to those in the related art, and shall not be described herein any further. It should be noted that the network device 2800 does not necessarily include all the parts shown in FIG. 28, and furthermore, the network device 2800 may include parts not shown in FIG. 28, and the related art may be referred to.

The embodiment of this disclosure further provides a terminal equipment; however, this disclosure is not limited thereto, and it may also be another equipment.

Figure 29:
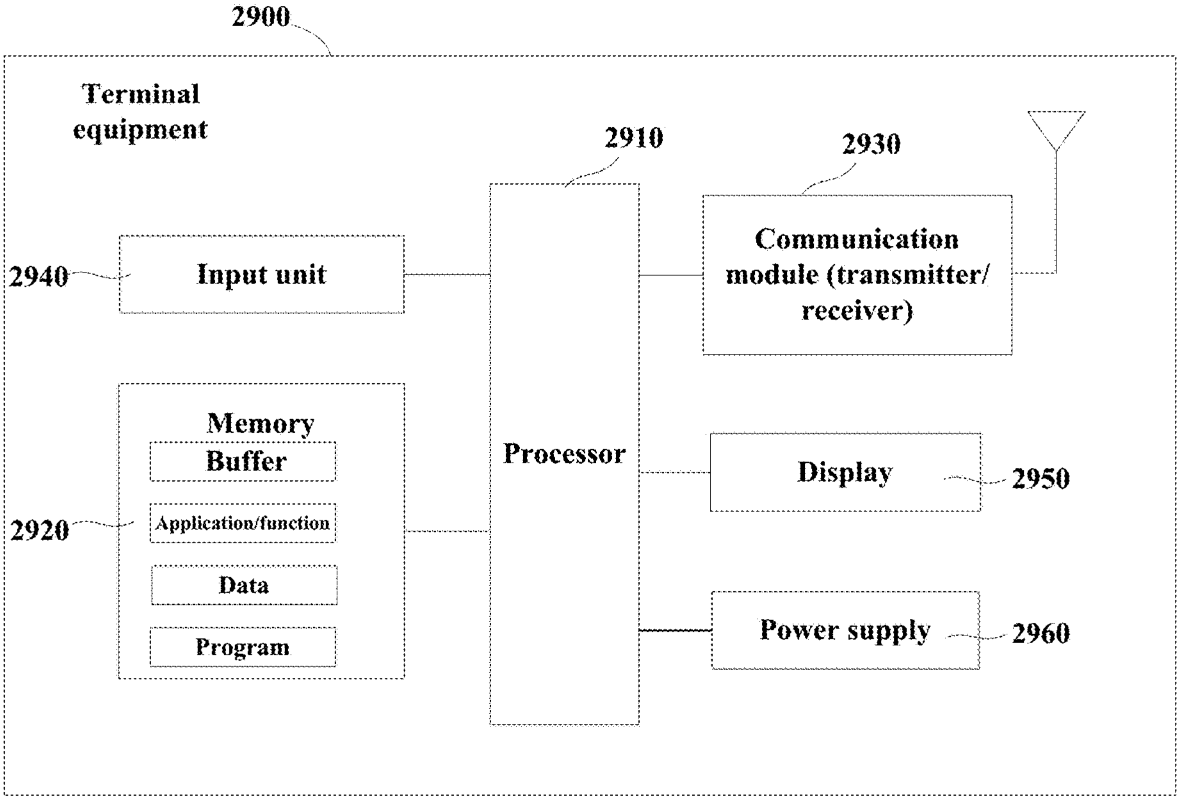
FIG. 29 is a schematic diagram of the terminal equipment of an embodiment of this disclosure.

FIG. 29 is a schematic diagram of the terminal equipment of the embodiment of this disclosure. As shown in FIG. 29, the terminal equipment 2900 may include a processor 2910 and a memory 2920, the memory 2920 storing data and a program and being coupled to the processor 2910. It should be noted that this figure is illustrative only, and other types of structures may also be used, so as to supplement or replace this structure and achieve a telecommunications function or other functions.

For example, the processor 2910 may be configured to execute a program to carry out the inter-UE coordination method as described in the embodiments of the first aspect. For example, the processor 2910 may be configured to perform the following control: transmitting sidelink control information and sidelink data information, the sidelink control information indicating a reserved resource; performing preemption detection on the reserved resource; and determining whether to receive coordination information used to indicate that a conflict occurs in the reserved resource, and/or determining whether to perform resource reselection based on the received coordination information, according to whether the reserved resource is preempted. For example, the processor 2910 may be configured to execute a program to carry out the inter-UE coordination method as described in the embodiments of the second aspect. For example, the processor 2910 may be configured to perform the following control: receiving sidelink control information and sidelink data information, the sidelink control information indicating a reserved resource; determining whether the reserved resource is reselected; and determining whether to transmit coordination information used to indicate that a conflict occurs in the reserved resource according to whether the reserved resource is reselected.

For example, the processor 2910 may be configured to execute a program to carry out the inter-UE coordination method as described in the embodiments of the third aspect. For example, the processor 2910 may be configured to perform the following control: transmitting sidelink control information and sidelink data information, the sidelink control information indicating a reserved resource; receiving acknowledgement (ACK) or non-acknowledgement (NACK) fed back for the sidelink transmission indicated by the sidelink control information; and determining whether to receive coordination information indicating that a conflict occurs in the reserved resource, and/or determining whether to perform resource reselection based on the received coordination information, according to whether the acknowledgement (ACK) has been received.

For example, the processor 2910 may be configured to execute a program to carry out the inter-UE coordination method as described in the embodiments of the fourth aspect. For example, the processor 2910 may be configured to perform the following control: receiving sidelink control information and sidelink data information, the sidelink control information indicating a reserved resource; determining whether to feed back acknowledgement (ACK) for sidelink transmission to which the sidelink control information corresponds; and determining whether to transmit coordination information used to indicate that a conflict occurs in the reserved resource according to whether to feed back acknowledgement (ACK).

As shown in FIG. 29, the terminal equipment 2900 may further include a communication module 2930, an input unit 2940, a display 2950, and a power supply 2960; wherein functions of the above components are similar to those in the related art, which shall not be described herein any further. It should be noted that the terminal equipment 2900 does not necessarily include all the parts shown in FIG. 29, and the above components are not necessary. Furthermore, the terminal equipment 2900 may include parts not shown in FIG. 29, and the related art may be referred to.

An embodiment of this disclosure provides a computer readable program, which, when executed in a terminal equipment, will cause the terminal equipment to carry out the inter-UE coordination method as described in the embodiments of the first to the fourth aspects.

An embodiment of this disclosure provides a computer readable medium, including a computer readable program, which will cause a terminal equipment to carry out the inter-UE coordination method as described in the embodiments of the first to the fourth aspects.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

Supplement 1. An inter-UE coordination method, including:

- transmitting sidelink control information and sidelink data information by a second terminal equipment, the sidelink control information indicating a reserved resource;
- performing preemption detection on the reserved resource; and
- determining whether to receive coordination information used to indicate that a conflict occurs in the reserved resource, and/or determining whether to perform resource reselection based on the received coordination information, according to whether the reserved resource is preempted.

Supplement 2. The method according to supplement 1, wherein when the reserved resources are not preempted, the second terminal equipment determines to receive the coordination information, and when the reserved resources are preempted, the second terminal equipment determines to skip receiving the coordination information.

Supplement 3. The method according to supplement 1, wherein when the reserved resources are not preempted, the second terminal equipment determines to perform resource reselection based on the received coordination information, and when the reserved resources are preempted, the second terminal equipment determines to skip performing resource reselection based on the received coordination information.

Supplement 4. The method according to any one of supplements 1-3, wherein at a second slot prior to a first time interval of a first slot receiving the coordination information, the second terminal equipment detects whether the reserved resource is preempted, wherein the first time interval is greater than or equal to 0.

Supplement 5. The method according to any one of supplements 1-4, wherein the reserved resources are indicated by frequency resource assignment and time resource assignment field or a resource reservation period field in the sidelink control information.

Supplement 6. The method according to any one of supplements 1-5, wherein there exists a second time interval between the reserved resource and at least one piece of sidelink control information indicating the reserved resource, and there exists a receiving slot of the coordination information within the second time interval.

Supplement 7. The method according to supplement 6, wherein the second time interval includes a third time interval and a fourth time interval, the third time interval being a time interval between the reserved resource and a corresponding receiving slot of the coordination information, and the fourth time interval being an interval between the receiving slot of the coordination information and the sidelink control information indicating the reserved resource.

Supplement 8. The method according to supplement 7, wherein the third time interval is greater than or equal to a threshold in units of logical slots.

Supplement 9. The method according to supplement 7 or 8, wherein on the premise that the third time interval is satisfied, the receiving slot of the coordination information corresponding to the reserved resource is a slot where a physical sidelink feedback channel is located most close to a slot where the reserved resource is located.

Supplement 10. The method according to supplement 7, wherein the fourth time interval is determined based on a UE capability or UE implementation.

Supplement 11. The method according to any one of supplements 1-10, wherein the method further includes:

- receiving, by the second terminal equipment, acknowledgement (ACK) or nonacknowledgement (NACK) fed back for sidelink transmission; and
- determining whether to receive the coordination information, and/or determining whether to perform the resource reselection based on the received coordination information, according to whether the ACK has been received before the coordination information is received.

Supplement 12. The method according to supplement 11, wherein in a case where the ACK has been received before the coordination information is received, the second terminal equipment determines to skip receiving the coordination information or skip performing the resource reselection based on the received coordination information.

Supplement 13. The method according to supplement 11, wherein in a case where the ACK has not been received before the coordination information is received and the reserved resource is not preempted, the second terminal equipment determines to receive the coordination information or determines to perform the resource reselection based on the received coordination information;

and in a case where the ACK has not been received before the coordination information is received and the reserved resource is preempted, the second terminal equipment determines to skip receiving the coordination information or skip performing the resource reselection based on the received coordination information.

Supplement 14. The method according to any one of supplements 1-13, wherein sidelink transmission indicated by the sidelink control information is of unicast, groupcast or broadcast.

Supplement 15. An inter-UE coordination method, including:

receiving sidelink control information and sidelink data information by a first terminal equipment, the sidelink control information indicating a reserved resource;

determining whether the reserved resource is reselected; and determining whether to transmit coordination information used to indicate that a conflict occurs in the reserved resource according to whether the reserved resource is reselected.

Supplement 16. The method according to supplement 15, wherein the method further includes:

in a case where the reserved resource is not reselected by a second terminal equipment, transmitting first coordination information by the first terminal equipment to the second terminal equipment; and in a case where the reserved resource is reselected by the second terminal equipment, skipping transmitting the first coordination information to the second terminal equipment.

Supplement 17. The method according to supplement 15, wherein the method further includes:

in the case where the reserved resource is reselected by the second terminal equipment, determining that the reserved resource is released, and skipping transmitting to other terminal equipment the second coordination information indicating conflicts occur between other reserved resources and the reserved resource.

Supplement 18. The method according to any one of supplements 15-17, wherein the method further includes:

when the acknowledgement (ACK) is fed back for sidelink transmission indicated by the sidelink control information from the second terminal equipment, skipping transmitting the first coordination information to the second terminal equipment by the first terminal equipment.

Supplement 19. The method according to any one of supplements 15-17, wherein the method further includes:

when the acknowledgement (ACK) is fed back for sidelink transmission indicated by the sidelink control information from the second terminal equipment, determining by the first terminal equipment that the reserved resource is released, and skipping transmitting the second coordination information indicating that a conflict occurs between other reserved resources and the reserved resource to other terminal equipment.

Supplement 20. The method according to any one of supplements 15-19, wherein at a second slot prior to a first time interval of a first slot receiving the coordination information, the first terminal equipment determines whether the reserved resource is reselected, wherein the first time interval is greater than or equal to 0.

Supplement 21. An inter-UE coordination method, including:

transmitting sidelink control information and sidelink data information by a second terminal equipment, the sidelink control information indicating a reserved resource;

receiving acknowledgement (ACK) or non-acknowledgement (NACK) fed back for the sidelink transmission indicated by the sidelink control information; and determining whether to receive coordination information indicating that a conflict occurs in the reserved resource, and/or determines whether to perform resource reselection based on the received coordination information, according to whether the acknowledgement (ACK) has been received.

Supplement 22. The method according to supplement 21, wherein in a case where the ACK has been received before receiving the coordination information, the second terminal equipment determines to skip receiving the coordination information or skip performing resource reselection based on the received coordination information;

and in a case where the ACK is not received before receiving the coordination information, the second terminal equipment determines to receive the coordination information or perform resource reselection based on the received coordination information.

Supplement 23. The method according to supplement 21, wherein sidelink transmission indicated by the sidelink control information is of unicast, groupcast or broadcast.

Supplement 24. An inter-UE coordination method, including:

receiving sidelink control information and sidelink data information by a first terminal equipment, the sidelink control information indicating a reserved resource;

determining whether to feed back acknowledgement (ACK) for sidelink transmission to which the sidelink control information corresponds; and determining whether to transmit coordination information used to indicate that a conflict occurs in the reserved resource according to whether to feed back acknowledgement (ACK).

Supplement 25. The method according to supplement 24, wherein the method further includes:

when the acknowledgement (ACK) is fed back for sidelink transmission indicated by the sidelink control information, skipping transmitting the first coordination information to the second terminal equipment by the first terminal equipment.

Supplement 26. The method according to supplement 24, wherein the method further includes:

for a reserved resource where the acknowledged (ACK) is transmitted, determining by the first terminal equipment that the reserved resource is released, and skipping transmitting the second coordination information indicating that a conflict occurs between other reserved resources and the reserved resource to other terminal equipment.

Supplement 27. A terminal equipment, including a memory and a processor, the memory storing a computer program, and the processor being configured to execute the computer program to carry out the inter-UE coordination method as described in any one of supplements 1-26.

The invention claimed is:

1. An inter-UE coordination apparatus, the apparatus comprising:

a transmitter configured to transmit sidelink control information and sidelink data information, the sidelink control information indicating a reserved resource; and a processor configured to determine to receive a physical sidelink feedback channel used to indicate that a conflict occurs in the reserved resource;

wherein there exists a second time interval between the reserved resource and the sidelink control information indicating the reserved resource, there existing a receiving slot of the physical sidelink feedback channel in the second time interval, the second time interval including a third time interval and a fourth time interval, the third time interval being a time interval between the reserved resource and the receiving slot of the physical sidelink feedback channel, and the fourth time interval being an interval between the receiving slot of the physical sidelink feedback channel and the sidelink control information indicating the reserved resource, and the third time interval is greater than or equal to a threshold.

2. The apparatus according to claim 1, wherein the receiving slot of the physical sidelink feedback channel is a slot where a physical sidelink feedback channel is located and nearest to a slot where the reserved resource is located.

3. The apparatus according to claim 1, wherein an index of a physical sidelink feedback channel resource is determined as a physical layer source identity related to the reserved resource after performing a modulus operation on a number of physical sidelink feedback channel resources.

4. The apparatus according to claim 1, wherein the reserved resource is indicated by a frequency resource assignment and time resource assignment field or a resource reservation period field of the sidelink control information.

5. The apparatus according to claim 1, wherein sidelink transmission indicated by the sidelink control information is of unicast, groupcast or broadcast.

6. An apparatus comprising:

a receiver configured to receive sidelink control information and sidelink data information, the sidelink control information indicating a reserved resource; and a transmitter configured to transmit a physical sidelink feedback channel used to indicate that a conflict occurs in the reserved resource, wherein there exists a second time interval between the reserved resource and the sidelink control information indicating the reserved resource, there existing a receiving slot of the physical sidelink feedback channel in the second time interval, the second time interval including a third time interval and a fourth time interval, the third time interval being a time interval between the reserved resource and the receiving slot of the physical sidelink feedback channel, and the fourth time interval being an interval between the receiving slot of the physical sidelink feedback channel and the sidelink control information indicating the reserved resource, and the third time interval is greater than or equal to a threshold.

* * * * *